US012620050B1

(12) United States Patent
Tan et al.

(10) Patent No.: US 12,620,050 B1
(45) Date of Patent: May 5, 2026

(54) DECODING ACCELERATION WITH HARDWARE DECODER

(71) Applicant: Amazon Technologies, Inc., Seattle, WA (US)

(72) Inventors: Xiaodan Tan, Santa Clara, CA (US); Paul Gilbert Meyer, Jericho, TX (US)

(73) Assignee: Amazon Technologies, Inc., Seattle, WA (US)

( * ) Notice: Subject to any disclaimer, the term of this patent is extended or adjusted under 35 U.S.C. 154(b) by 524 days.

(21) Appl. No.: 17/804,791

(22) Filed: May 31, 2022

(51) Int. Cl.
*G06T 1/20* (2006.01)
*G06T 9/00* (2006.01)

(52) U.S. Cl.
CPC ................ *G06T 1/20* (2013.01); *G06T 9/005* (2013.01)

(58) Field of Classification Search
CPC ...... G06T 1/20; G06T 9/005; G06F 2211/007
See application file for complete search history.

(56) References Cited

U.S. PATENT DOCUMENTS

| | | | |
|---|---|---|---|
| 5,754,456 A | 5/1998 | Eitan et al. |
| 5,754,457 A | 5/1998 | Eitan et al. |
| 6,742,010 B1 | 5/2004 | Hus et al. |
| 6,754,687 B1 | 6/2004 | Kurak, Jr. et al. |
| 6,832,232 B1 | 12/2004 | Hus et al. |
| 6,907,438 B1 | 6/2005 | Horton et al. |
| 7,020,671 B1 | 3/2006 | Saha |
| 7,685,212 B2 | 3/2010 | Sebot et al. |
| 9,554,134 B2 | 1/2017 | Sermadevi et al. |

| | | | |
|---|---|---|---|
| 10,083,034 B1 | 9/2018 | Satpathy et al. |
| 11,941,397 B1 | 3/2024 | Tan et al. |
| 12,021,551 B2 | 6/2024 | Guilford et al. |
| 12,039,330 B1 | 7/2024 | Meyer |
| 2002/0154693 A1 | 10/2002 | Demos et al. |
| 2007/0188503 A1* | 8/2007 | Cheng ........................ G06T 1/20 345/501 |
| 2009/0070552 A1* | 3/2009 | Kanstein ............. G06F 15/7867 717/140 |

(Continued)

OTHER PUBLICATIONS

S. A. Milinković, "Software JPEG decoder for embedded systems," 2012 20th Telecommunications Forum (TELFOR), Belgrade, Serbia, 2012, pp. 1284-1287 (Year: 2012).*

(Continued)

*Primary Examiner* — Sumati Lefkowitz
*Assistant Examiner* — Aaron Joseph Sorrin
(74) *Attorney, Agent, or Firm* — Weaver Austin Villeneuve & Sampson LLP

(57) ABSTRACT

Techniques to speed up decoding of compressed data objects may include offloading a decoding function to a decoder accelerator. The techniques may include a processor parsing the header including one or more code tables from a compressed data object, loading code data for one or more code tables into the decoder accelerator, and providing the encoded data from the compressed data object to the decoder accelerator via a decoder bus interface. The decoder accelerator decodes the encoded data into decoded data blocks. The processor then receives the decoded data blocks from the decoder accelerator via the decoder bus interface, generates pre-transformation data blocks based on the decoded data blocks by performing inverse domain transformation, and converts the pre-transformation data blocks into a decompressed data object.

20 Claims, 18 Drawing Sheets

(56) References Cited

U.S. PATENT DOCUMENTS

| | | |
|---|---|---|
| 2010/0150242 A1 | 6/2010 | Ozawa |
| 2011/0283061 A1 | 11/2011 | Reddy |
| 2013/0099947 A1 | 4/2013 | Dickie et al. |
| 2014/0043347 A1* | 2/2014 | Lee ........................ H04N 19/63 |
| | | 345/522 |
| 2014/0098890 A1* | 4/2014 | Sermadevi ........... H04N 19/105 |
| | | 375/240.24 |
| 2017/0150181 A1* | 5/2017 | Krasnoborski ...... H04N 19/436 |
| 2018/0129631 A1 | 5/2018 | Van Eijndhoven et al. |
| 2020/0145683 A1* | 5/2020 | Dikshit .................. H04N 19/91 |
| 2022/0200623 A1 | 6/2022 | Guilford et al. |

OTHER PUBLICATIONS

U.S. Appl. No. 17/804,793, inventors Tan et al., filed May 31, 2022.
U.S. Appl. No. 17/804, 796, inventors Tan et al., filed May 31, 2022.
U.S. Restriction Requirement dated Dec. 9, 2024 in U.S. Appl. No. 17/804,793.
U.S. Notice of Allowance dated Nov. 8, 2023 in U.S. Appl. No. 17/804,796.
U.S. Non-Final Office Action dated Aug. 1, 2023, in U.S. Appl. No. 17/804,796.
U.S. Non-Final Office Action dated Apr. 23, 2025 in U.S. Appl. No. 17/804,793.
Wikipedia: The Free Encyclopedia, "Huffman coding," 2025, 11 pages, retrieved from the Internet on Apr. 18, 2025 at URL: https://en.wikipedia.org/wiki/Huffman_coding.
U.S. Final Office Action dated Oct. 8, 2025 in U.S. Appl. No. 17/804,793.

* cited by examiner

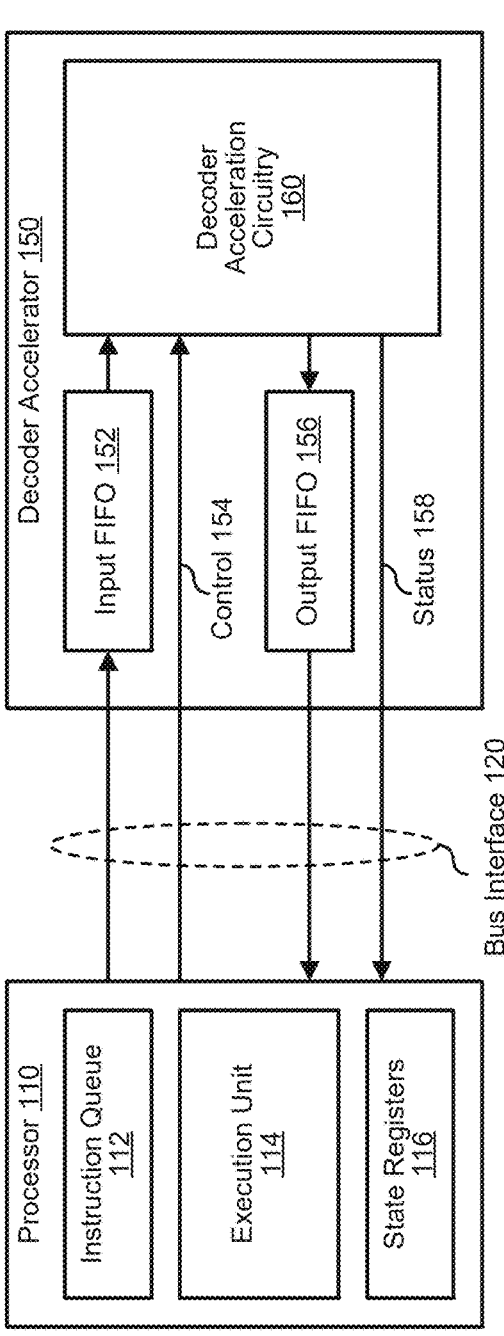
FIG. 1

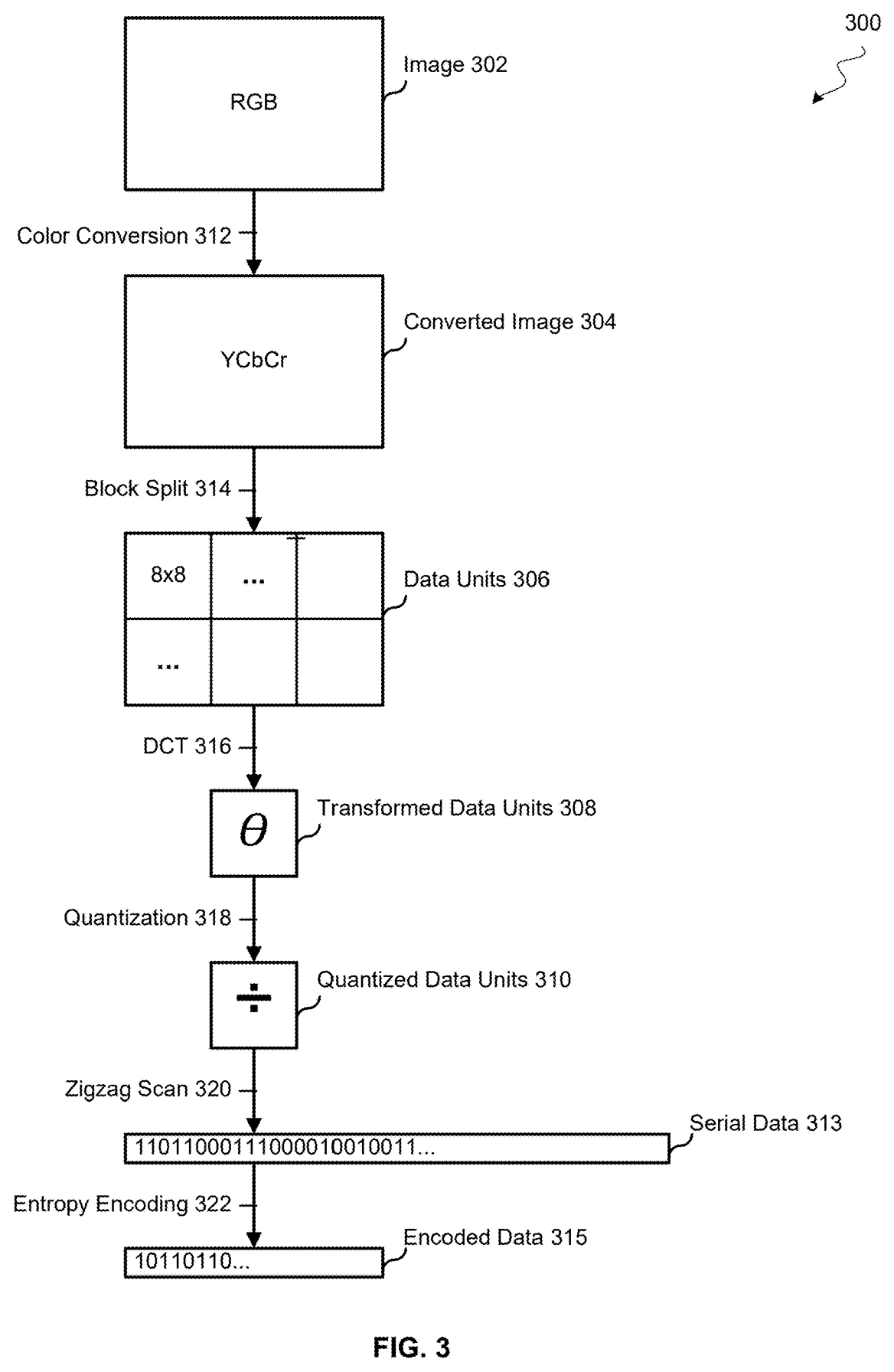

300

RGB — Image 302

Color Conversion 312

YCbCr — Converted Image 304

Block Split 314

| 8x8 | ... | |
|-----|-----|---|
| ... | | |

Data Units 306

DCT 316

$\theta$ — Transformed Data Units 308

Quantization 318

÷ — Quantized Data Units 310

Zigzag Scan 320

110110001110000100100011... — Serial Data 313

Entropy Encoding 322

10110110... — Encoded Data 315

FIG. 3

410
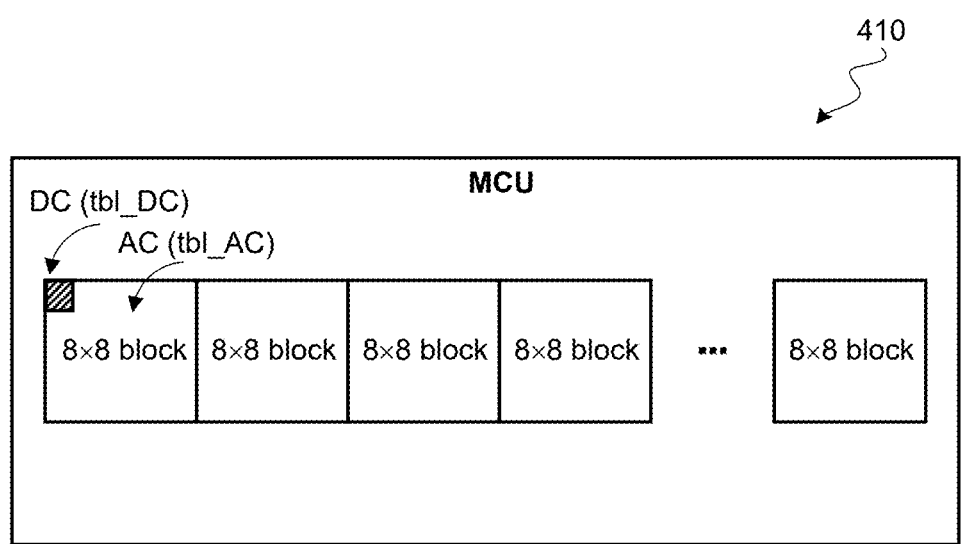
max Huffman tables / image = 4 (JPEG standard)
420
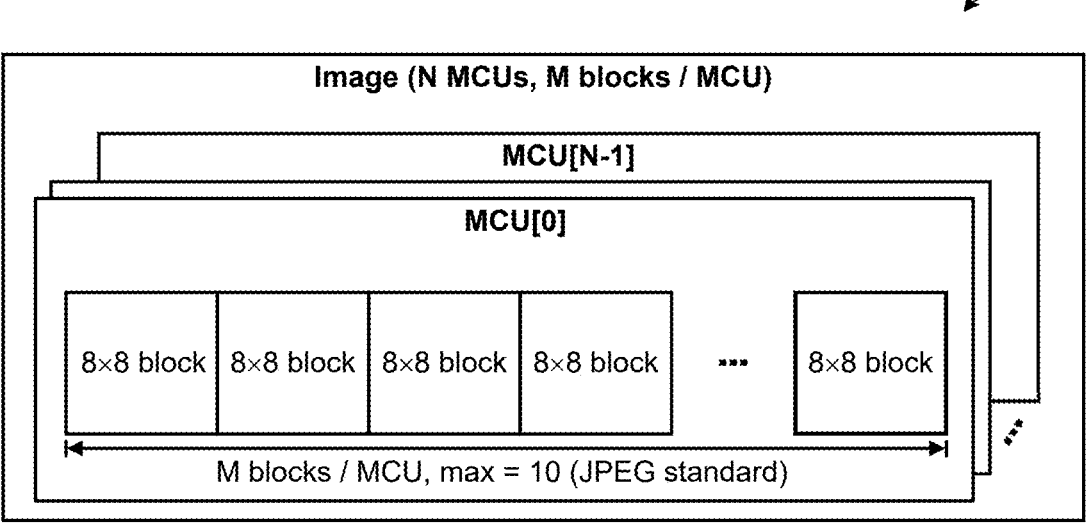
FIG. 4

1400

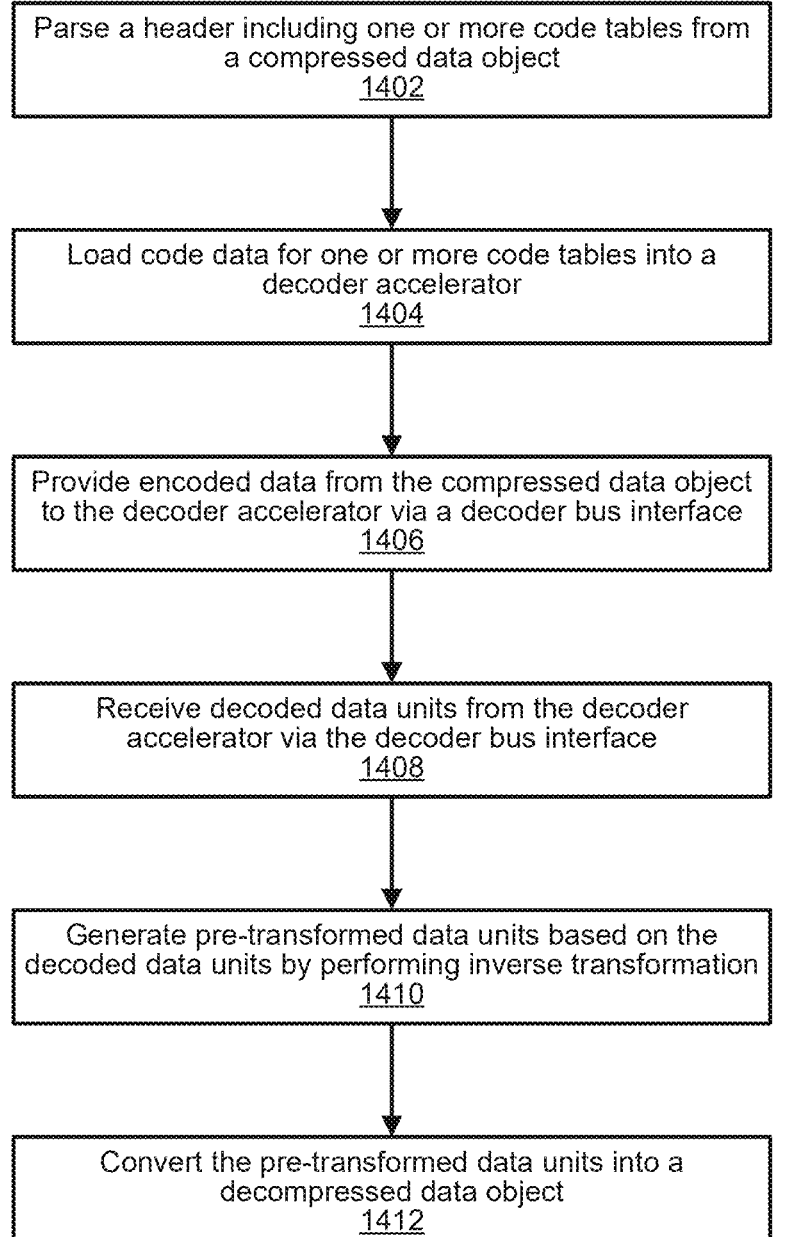

Parse a header including one or more code tables from
a compressed data object
1402

Load code data for one or more code tables into a
decoder accelerator
1404

Provide encoded data from the compressed data object
to the decoder accelerator via a decoder bus interface
1406

Receive decoded data units from the decoder
accelerator via the decoder bus interface
1408

Generate pre-transformed data units based on the
decoded data units by performing inverse transformation
1410

Convert the pre-transformed data units into a
decompressed data object
1412

FIG. 14

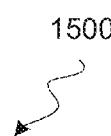
1500
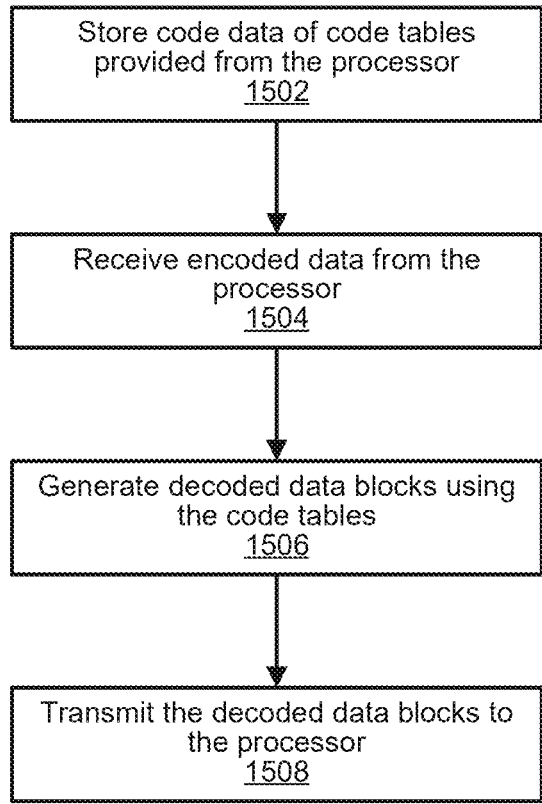
Store code data of code tables
provided from the processor
1502
Receive encoded data from the
processor
1504
Generate decoded data blocks using
the code tables
1506
Transmit the decoded data blocks to
the processor
1508
FIG. 15

1600

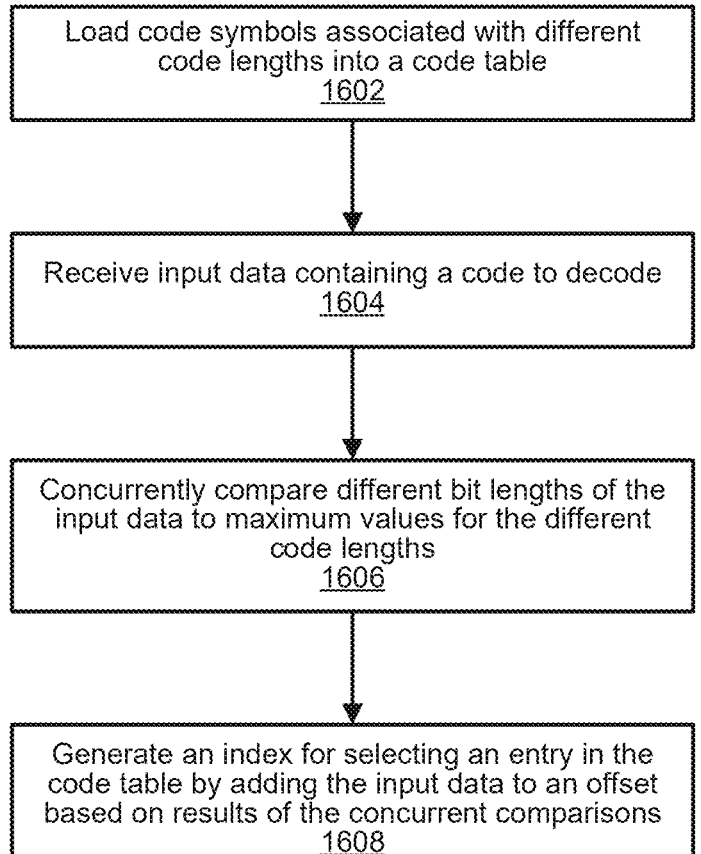

Load code symbols associated with different
code lengths into a code table
1602

Receive input data containing a code to decode
1604

Concurrently compare different bit lengths of the
input data to maximum values for the different
code lengths
1606

Generate an index for selecting an entry in the
code table by adding the input data to an offset
based on results of the concurrent comparisons
1608

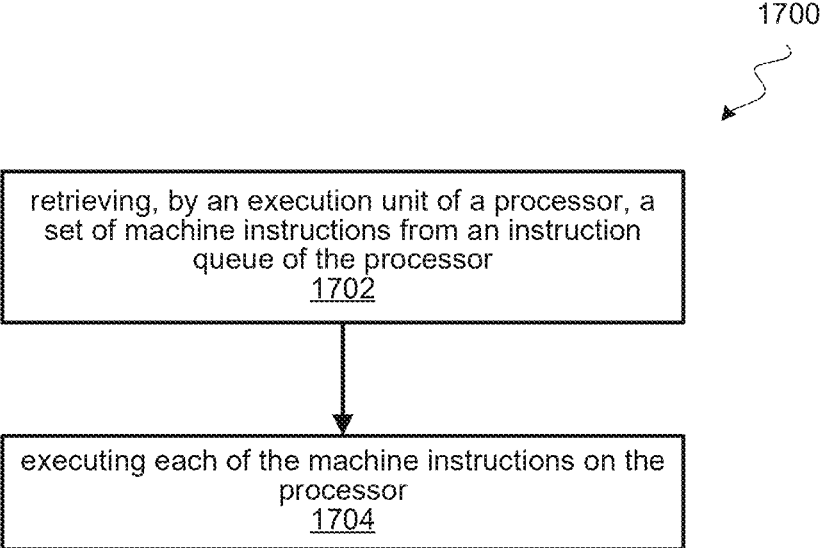

retrieving, by an execution unit of a processor, a
set of machine instructions from an instruction
queue of the processor
1702 executing each of the machine instructions on the
processor
1704

FIG. 17

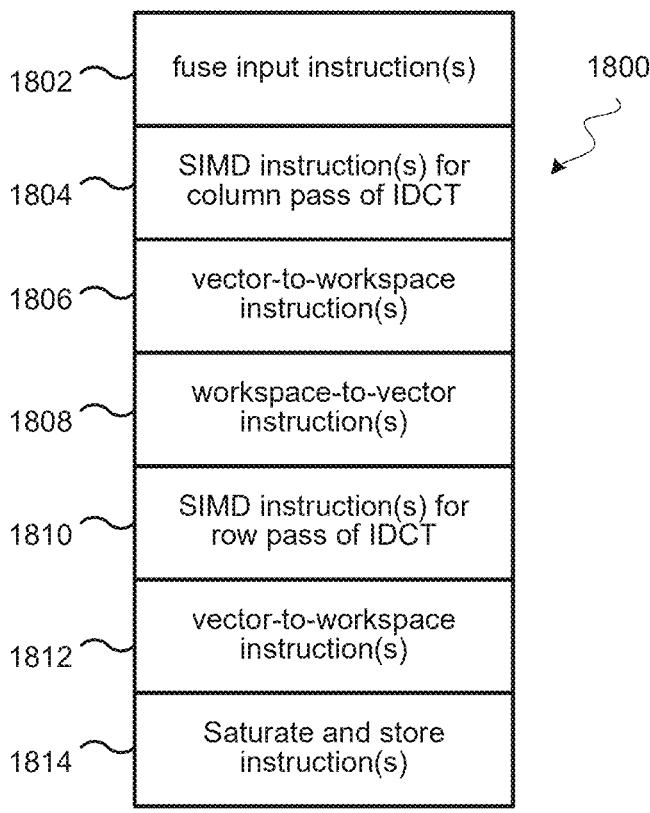

1800

1802 — fuse input instruction(s)

1804 — SIMD instruction(s) for column pass of IDCT

1806 — vector-to-workspace instruction(s)

1808 — workspace-to-vector instruction(s)

1810 — SIMD instruction(s) for row pass of IDCT

1812 — vector-to-workspace instruction(s)

1814 — Saturate and store instruction(s)

FIG. 18

DECODING ACCELERATION WITH HARDWARE DECODER

BACKGROUND

Various techniques can be used to compress large data objects such as images and video to reduce storage space. Compressing a data object can also reduce the transmission time of the data object because fewer data bits are transmitted as compared to the uncompressed data object. An example of an effective compression technique is entropy encoding in which the most common data symbol occurring in the data object is encoded using the least number of bits.

BRIEF DESCRIPTION OF THE DRAWINGS

Various embodiments in accordance with the present disclosure will be described with reference to the drawings, in which:

FIG. 1 illustrates a block diagram of an example of a computing system to accelerate data decoding;

FIG. 3 illustrates an example of an image encoding process;

FIG. 4 illustrates an example of data blocks organization;

FIG. 14 illustrates a flow diagram of an example of a decoding process;

FIG. 15 illustrates a flow diagram of another example of a decoding process;

FIG. 16 illustrates a flow diagram of a further example of a decoding process;

FIG. 17 illustrates a flow diagram of an example of a machine instruction execution process;

FIG. 18 illustrates a conceptual diagram of an example of an instruction queue.

DETAILED DESCRIPTION

Figure 2:
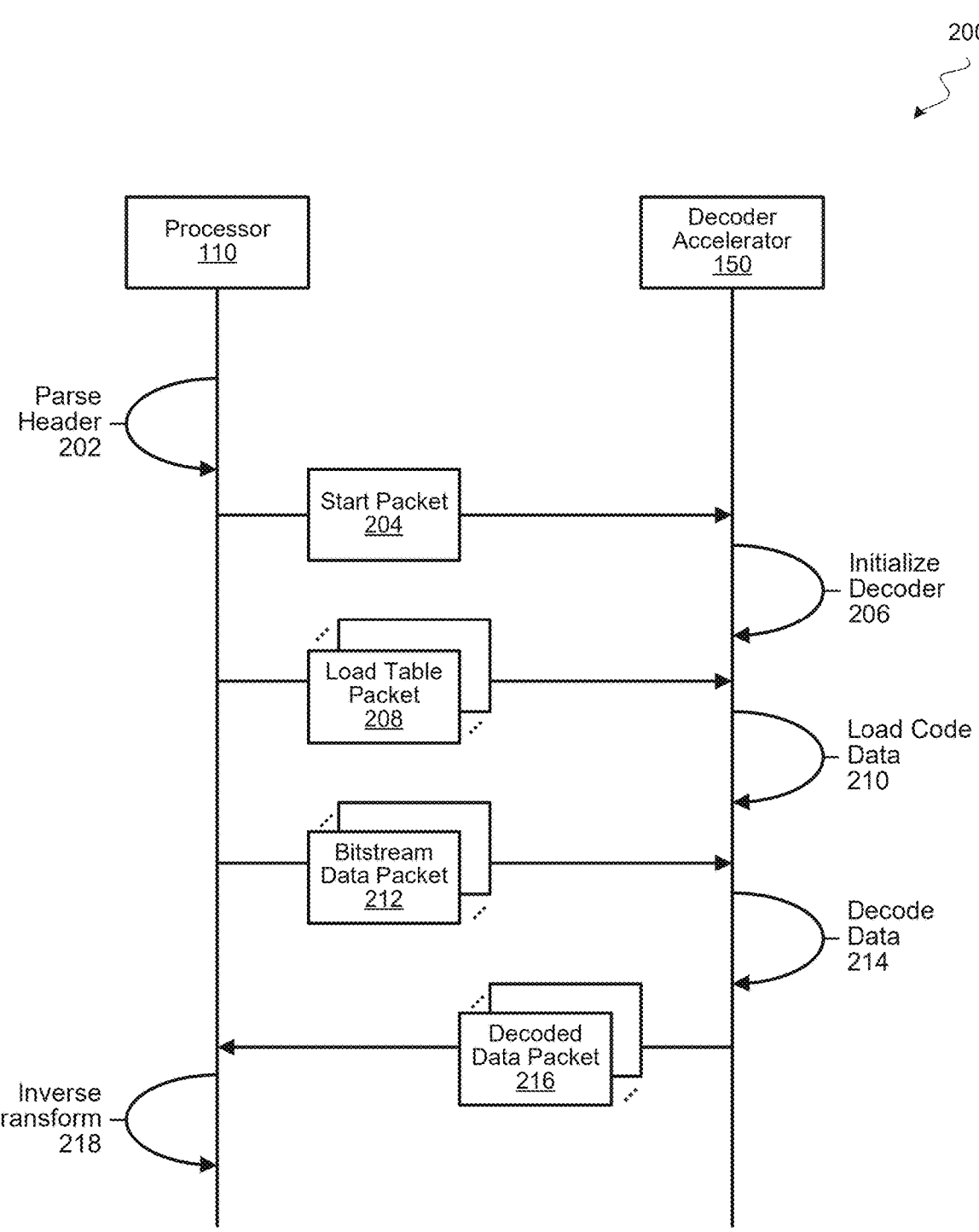
FIG. 2 illustrates a conceptual diagram of an example of interactions between a processor and an accelerator.

Processor architectures can be designed to support single instruction multiple data (SIMD) instructions to increase computational parallelism to achieve higher compute throughput. A SIMD instruction is a single machine instruction (may also be referred to as a processor instruction), which when executed by the processor, operates on multiple data elements simultaneously. A processor can support such instructions by implementing parallel computational data paths. For example, a processor may include a number of arithmetic logic units (ALUs) that can operate in parallel to perform computations on a corresponding number of data elements simultaneously. Although such parallel hardware architecture can significantly improve compute throughput, processors employing such architecture may provide little improvement when decoding data objects that have been encoded using certain techniques such as entropy encoding. This is because decoding such data is mostly a serialized process due to the variable length codes appearing in the compressed data. Such encoding techniques make it difficult to determine where the next code begins in the data stream without having first decoded the previous code. As such, the input data cannot be easily split up for parallel processing because it is unclear where to partition the input data to keep the code words intact.

The techniques disclosed herein provide a hardware decoder to accelerate the decoding process of compressed data objects. The hardware decoder can be coupled with a processor that supports SIMD instructions to process data objects that can benefit from both parallel and serial processing. Processing steps which are parallelizable can be performed in the processor to take advantage of the SIMD instructions, and processing steps such as decoding steps that are serial in nature can be performed in the hardware decoder. The hardware decoder can operate in a pipelined manner with the processor to reduce latency and improve throughout. In some implementations, machine instructions can be implemented to assist with preparing and organizing the decoded data provided from the hardware decoder for consumption by the SIMD instructions in the processor.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computing system 100 that can accelerate data decoding. Computing system 100 may include a processor 110 coupled to a decoder accelerator 150 via a decoder bus interface. Processor 110 may include an instruction queue 112, an execution unit 114, and state registers 116. Instruction queue 112 is operable to store pending machine instructions fetched from memory that are waiting for execution. Each entry in the instruction queue 112 may hold a single machine instruction. Such machine instructions can be part of the instruction set architecture (ISA) of the processor that the machine instructions are executed on. Examples of ISA may include x86, ARM, Xtensa, etc. SIMD is a type of machine instructions that can operate on multiple data elements simultaneously. An ISA may include a subset of SIMD instructions supported by the processor architecture. Machine instructions are typically defined at the design phase of the processor architecture. Some processor architectures such as Xtensa provides configurable processor cores, which allows custom machine instructions to be implemented. For example, some Xtensa processors uses a Tensilica instruction extension (TIE) to configure the processor core with custom instructions.

Execution unit 114 is operable to execute machine instructions from the instruction queue 112. In some implementations, processor 110 may include an instruction decoder (not shown) to decode the instructions stored in instruction queue 112 to control the execution unit 114. Execution unit 114 may support execution of SIMD instructions by implementing parallel computational data paths. When a SIMD instruction is executed, execution unit 114 may access data elements stored at multiple registers, operate on the data simultaneously, and store the results in multiple registers using just a single instruction. For example, execution unit 114 may include 16 arithmetic logic units (ALU) to perform 16 computations on parallel data with just a single SIMD instruction. If the ALU supports 32-bit computations, then the processor is capable of performing 16×32-bit calculations in parallel. In some implementations, execution unit 114 may also include programmable functional units and input/output interfaces with customizable ports and queues to implement custom machine instructions.

State registers 116 can provide an internal workspace storage for processor 110. When executing instructions, execution unit 114 can obtain the data to be operated on from state registers 116, and/or store operation results into state registers 116. Execution unit 114 may also execute instructions to move data between the state registers 116 and memory. In some implementations, state registers 116 can be arranged to accommodate concurrent access of multiple data elements for execution unit 114 when executing SIMD instructions.

Decoder accelerator 150 is an example of an integrated circuit device that can be used to offload decoding operations from processor 110. Decoder accelerator 150 includes decoder acceleration circuitry 160, an input first-in-first-out buffer (FIFO) 152, and an output FIFO 156. Input FIFO 152 is used to temporarily store data provided from processor 110 before the data can be processed by decoder acceleration circuitry 160. Output FIFO 156 is used to temporarily store decoded data outputted by decoder accelerator 150 before being transmitted to processor 110. Decoder acceleration circuitry 160 may include circuitry tailored to decode an input data stream. For example, decoder acceleration circuitry 160 may include a table storage subsystem to store information associated with a code table that provides a mapping between code symbols and encoded data. Decoder acceleration circuitry 160 may also include selection circuitry to select a code symbol from the table storage subsystem that corresponds to the input data being processed. In some implementations, the code symbol selected from the table storage subsystem can be the actual decoded data, and the code symbol can be provided as the decoded data back to processor 110 for further processing. In some implementations, the code symbol may not be the actual decoded data, but may contain information representing the decoded data (e.g., an additional layer of encoding). In such implementations, decoder acceleration circuitry 160 may include additional decode logic to reproduce the decoded data from the code symbol obtained from the table storage subsystem. Upon decoding the input data, decoder acceleration circuitry 160 may provide the decoded data to output FIFO 156 for transmission back to processor 110 for further processing. Decoder accelerator 150 may also operate in a pipelined manner with processor 110 such that while processor 110 is performing further processing on a previous set of data decoded by decoder accelerator 150, the decoder accelerator 150 is concurrently decoding the next set of data.

Some encoding schemes may use multiple code tables to encode a data object. As such, decoder acceleration circuitry 160 may include multiple table storage subsystems in which each table storage subsystem is associated with a code table and is used to store information for that code table. During operation, decode accelerator 150 may dynamically switch between the table storage subsystems being used to decode the input data. For example, in encoding schemes that encode data at different positions using different code tables, decode accelerator 150 may switch table storage subsystems based on the position of the data being processed.

In addition to receiving input data, decoder acceleration circuitry 160 may also receive one or more control signals 154 from processor 110 that bypasses input FIFO 152. Such control signals 154 can be used, for example, to perform asynchronous reset of the decoder acceleration circuitry 160 in the event that the decoder acceleration circuitry 160 is in an unrecoverable error state. Decoder acceleration circuitry 160 may also provide one or more status signals 158 that bypasses output FIFO 156. Such status signals 158 may provide flow control to processor 110 to indicate whether decoder acceleration circuitry 160 has too much data to process, has insufficient data to process, or has encountered an error. Status signals 158 may also indicate a state of decoder acceleration circuitry 160 (e.g., whether decoder acceleration circuitry is decoding data, filling internal storage, idle, or waiting). Status signals 158 may also indicate the completion of decoding a data object (e.g., when an end of file is reached), and when a software reset is complete.

To facilitate data transfer between processor 110 and decoder accelerator 150, decoder bus interface 120 can be a packetized interface that supports various packet types. For example, in the direction from processor 110 to decoder accelerator 150, decoder bus interface 120 may support one or more of a start packet type, a load table packet type, and/or a send bitstream data packet type. The packet type of each packet being transmitted from processor 110 to decoder accelerator 150 can be identified by a packet identifier provided in the packet header of each packet.

The start packet type can be used to identify start packets being transmitted from processor 110 to decoder accelerator 150 to indicate the start of a new compressed data object. A start packet may include information on the structure of the compressed data object such as the number of packets that will be used to transmit the compressed data object, and a table sequence to indicate which code table sequence should be used to decode the compressed data object when multiple code tables are used to decode the compressed data object. Decoder acceleration circuitry 160 may use the start packet to initialize its internal logic in preparation for decoding the new compressed data object. For example, decoder acceleration circuitry 160 may perform one or more of setting up internal counters, flushing the tables storage subsystem(s), and/or initializing internal memory to zeros.

The load table packet type can be used to identify load table packets used for transmitting code data from processor 110 to decoder accelerator 150. As mentioned above, multiple code tables may be required to decode a data object, and thus processor 110 may transmit code data for multiple code tables to decoder accelerator 150. Hence, the packet header for load table packets may also include a table identifier to indicate which code table that the code data being transmitted in the packet belongs to. Furthermore, depending on the amount of code data and the size of the packet, the code data associated with a code table may span multiple packets. As such, the packet header for load table packets may also include a table segment identifier to indicate with segment of the code data for the code table is being transmitted in the corresponding packet.

The send bitstream data packet type can be used to identify bitstream data packets used for transmitting encoded data from processor 110 to decoder accelerator 150. In some implementations, the start of the encoded data for the data object may not be aligned in the first bitstream data packet. To support such scenarios, the start packet transmitted for the data object being decoded may include a start byte pointer to indicate the starting location of the encoded data in the first bitstream data packet being transmitted for the data object.

In the direction from decoder accelerator 150 to processor 110, decoder bus interface 120 may support a decoded data packet type for decoded data packets containing the decoded and decompressed data generated by decoder acceleration circuitry 160 based on the input data bitstream. In some implementations, each decoded data packet can be transmitted with sideband information to indicated whether the decoded data packet is an invalid block and if an error occurred. The sideband information may also include an end of data object indicator, which is asserted for the last decoded data packet being transmitted to processor 110 for the data object being decoded.

FIG. 2 illustrates a conceptual diagram 200 of an example of the interactions between processor 110 and decoder accelerator 150 when processing a data object. For example, the data object can be a compressed data object that was encoded using entropy encoding, and processor 110 may offload the decoding processing to decoder accelerator 150.

Processing of the data object may begin with processor 110 parsing a header from the data object at operation 202. The header may include information about the structure and organization of the data object, and one or more code tables that are used to decode the data object. For example, the header may include information such as the size of the data object, and the sequence of code tables that is used to decode the data object.

At operation 204, processor 110 may send a start packet to decoder accelerator 150 via decode bus interface 120 to indicate a new data object is being transmitted to decoder accelerator 150 for decoding. The start packet may include the table sequence for decoding the data object, a packet count representing the size of the data object, and a start byte pointer to indicate the location of the first byte of the encoded data in the first bitstream data packet that will subsequently be sent.

At operation 206, decoder accelerator 150 may initialize the decoder based on information in the start packet. For example, decoder accelerator 150 may set up its internal state machine for switching the code tables during decoding of the data object, and set up its internal counters to expect a certain number of packets to be received and decoded for the data object. Decoder accelerator 150 may also initialize an offset to point to the start byte of the encoded data in preparation for receiving the first bitstream data packet.

At operation 208, processor 110 may send multiple load table packets to decoder accelerator 150 via decode bus interface 120 to load code data for one or more code tables into the table storage subsystem(s) of decoder accelerator 150. Each load table packet can be transmitted with a table identifier in the packet header to indicate which code table in the decoder accelerator 150 is being loaded. Each load table packet can also be transmitted with a table segment identifier to indicate which segment of the code data is being transmitted when the code data for a code table spans multiple packets. It should be noted that although not depicted in such a manner, the load table packets can be transmitted to decoder accelerator 150 in a serial manner one packet after another.

At operation 210, decoder accelerator 150 may load and store the code data received in each load table packet into the table storage subsystem(s). For example, decoder accelerator 150 may use the table identifier provided in the packet header of the load table packet to load the code data in the received packet into the appropriate table storage subsystem for the code table corresponding to the table identifier. The packet header of the load table packet may also include a table segment identifier to indicate which segment of the code data is being transmitted when the code data for a code table spans multiple packets. Decoder accelerator 150 may use the table segment identifier to load the code data in the received packet into the appropriate location of the table storage subsystem corresponding to the code table.

At operation 212, processor 110 may send multiple bitstream data packets via decode bus interface 120 to provide the encoded data from the data object to decoder accelerator 150 for decoding. It should be noted that although not depicted in such a manner, the bitstream data packets can be transmitted to decoder accelerator 150 in a serial manner one packet after another. At operation 214, the decoder accelerator 150 can decode the data provided in the bitstream data packets as they are received. In some implementations, the decoder accelerator 150 can begin decoding the input data as soon as one bitstream data packet has been received. To decode the input data, decode accelerator 150 may dynamically switch to the appropriate table storage subsystem based on the table sequence information provided in the start packet and the position of the input data being processed. Decoder accelerator 140 may select, from the table storage subsystem, the proper code symbol mapped to the input data being received, and generated decoded data based on the code symbol.

At operation 216, the decoder accelerator 150 can send multiple decoded data packets via the decode bus interface 120 to processor 110 for further processing. It should be noted that although not depicted in such a manner, the decoded data packets can be transmitted to processor 110 in a serial manner one packet after another. Furthermore, decoder accelerator 150 may send decoded data packets to processor 110 while decoder accelerator 150 is receiving new bitstream data packets from processor 110 to process.

At operation 218, processor 110 may perform additional processing on the decoded data received from decoder accelerator 150. For example, if the data object has undergone any domain transformation (e.g., frequency transform) during the encoding process, processor 110 may generate pre-transformation data based on the decoded data by performing the inverse of the domain transformation. Processor 110 may also perform other post-processing such as dequantization, up-sampling, and/or other data conversion to convert the pre-transformation data to the decompressed data object. At least some of the post-processing of the decoded data can be performed using SIMD instructions supported by processor 110. To further increase throughput, processor 110 may perform the post-processing on a set of data at the same time decoder accelerator 150 is decoding the next set of data in a pipelined manner.

As mentioned above, utilizing a decoder accelerator to offload decoding operations from the processor can accelerate the decoding process, especially for data that has been encoded using entropy encoding because of the serial nature of the decoding process. One example of data objects that can benefit from the decoding techniques described herein is JPEG (Joint Photographic Experts Group) image files. JPEG images are encoded using Huffman coding, which is a type of entropy coding. JPEG images also employ run-length encoding to further reduce file size. Decoding the variable length codes used in JPEG images can be sped up significantly when offloading the decoding process to a hardware decoder accelerator.

FIG. 3 illustrates an example of a JPEG encoding process 300 to compress image data. The encoding process 300 starts with a RGB (red, green, blue) image 302, and performs color conversion 312 to generate a converted image 304 in YCbCr (luminance, chrominance blue, chrominance red) color space. In some implementations, the converted image 304 can be a down-sampled image (e.g., down-sample Cb/Cr components using a configurable ratio). A block splitting operation 314 is then performed on the converted image 304 to generate 8-pixel by 8-pixel (8×8) data blocks 306 for each color space component Y, Cb, and Cr.

Next, the encoding process 300 performs discrete cosine transform (DCT) 316 on each of the 8×8 data blocks to generate transformed 8×8 data blocks 308. Within an 8×8 transformed data block, lower frequency coefficients are located towards the top left corner, and higher frequency coefficients are located towards the bottom right corner. The upper left corner coefficient is the DC component coefficient, and the remaining 63 coefficients are the AC component coefficients. The encoding process 300 then performs a quantization operation 318 on each of the transformed data blocks by dividing each element of the data block with a corresponding value from a quantization table to generate quantized data blocks 310. Typically, the quantization table will contain large values towards the bottom right corner. Hence, performing quantization 318 tends to zero out the high frequency coefficients. In some implementations, different quantization tables can be used for data blocks of different color space components Y, Cb, and/or Cr. The resulting quantized values are then serialized into serial data 313 by performing a zigzag scan 320 of each 8×8 quantized data blocks 310. The zigzag scan 320 arranges the coefficients from high to low frequencies in a serial bitstream in serial data 313.

The encoding process 300 then performs entropy encoding 322 on serial data 313 to generate encoded data 315. The entropy encoding 322 can be a combination of Huffman encoding, run-length encoding, and variable length integers. For example, each non-zero coefficient in a data block can be represented as a symbol pair. The first symbol S1 of the symbol pair can be an 8-bit value that represents the number of preceding zeros immediately before the non-zero coefficient, and the bit length of the non-zero coefficient. The second symbol S2 of the symbol pair is the coefficient value itself. The first symbol S1 (number of preceding zeros, bit length of S2) is then encoded using Huffman encoding. The first symbol S1 may also be referred to herein as a code symbol because this is the symbol being encoded. There are also two special S1 symbols for end-of-block (0,0) and skip 16 zeros (15,0). Huffman encoding encodes the most frequent occurrence of S1 with the fewest number of bits. The Huffman codes can be generated from a binary search tree ordered according to the descending occurrence frequency of S1. The Huffman codes used for encoding S1 also have the property that the most significant (n−1) bits of the smallest Huffman code of length n are greater in value than the largest Huffman code of length (n−1). For example, if the largest 4-bit Huffman code is 1100, then all 5-bit Huffman codes are 1101× or greater. In other words, the most significant 4 bits of the 5-bit Huffman codes are all greater than 1100. The Huffman codes at a particular code length are also sequential because they are generated using the binary search tree. A Huffman table stores a mapping of S1 symbols S1 to their corresponding code. Encoded data 315 is the compressed form of the image data.

FIG. 4 illustrates an example of the organization of JPEG 8×8 data blocks. JPEG data blocks are organized into minimum coding units (MCUs), and a JPEG image can include N number of MCUs. A MCU can include up to 10 JPEG data blocks. The number of JPEG data blocks in a MCU can be different for different images, but the number of JPEG data blocks in MCUs belonging to an image is the same.

Referring to MCU 410, the different 8×8 blocks are usually for different color components. For example, for images with a 4:1:1 chroma subsample and YCbCr color space, a MCU may include 4 8×8 blocks of Y, 1 8×8 block of Cb, and 1 8×8 block of Cr. Decoding of a Y data block may use a different set of Huffman tables from Cb/Cr data blocks. In addition, the DC component of an 8×8 block (first coefficient) is encoded using a different Huffman table from the AC components (remaining 63 coefficients). Hence, decoding a JPEG image may require up to 4 different Huffman tables: an AC luminance (Y) Huffman code table, a DC luminance (Y) Huffman code table, an AC chrominance (Cb/Cr) Huffman code table, and a DC chrominance (Cb/Cr) Huffman code table.

Referring to image 420, as mentioned above, a JPEG image may include N number of MCUs (MCU[0] to MCU [N−1]), and each MCU can have M number of 8×8 data blocks. A MCU can have up to 10 number of 8×8 data blocks. Given that each data block includes both DC and AC coefficients, each 8×8 data block can be decoded using two Huffman tables. Accordingly, a sequence of up to 20 Huffman table identifiers can be used to indicate the sequence of Huffman tables to decode a MCU. Each MCU belong to the same image is decoded using the same sequence of Huffman tables.

Referring back to FIG. 3, to generate a JPEG image file from encoded data 315, a header is prepended to the encoded data bitstream. The header may include a start of frame containing information about the image such as the number of MCUs in the image, the number of data blocks in a MCU, and the table sequence of Huffman tables to decode the image. The header also includes the one or more quantization tables and the Huffman tables needed to decode the image. Markers indicating the different sections of the header, the start of image, end of image, etc. are also inserted into the bitstream to generate the JPEG image file.

The present disclosure will now describe using a hardware decoder accelerator (e.g., decoder accelerator 150) to accelerate JPEG image decoding. Although the description of certain aspects of the decoding techniques are described with reference to JPEG images, it should be understood that the techniques described herein are not limited to JPEG decoding, and can be applied to speed up decoding of other types of data objects.

Figure 5:
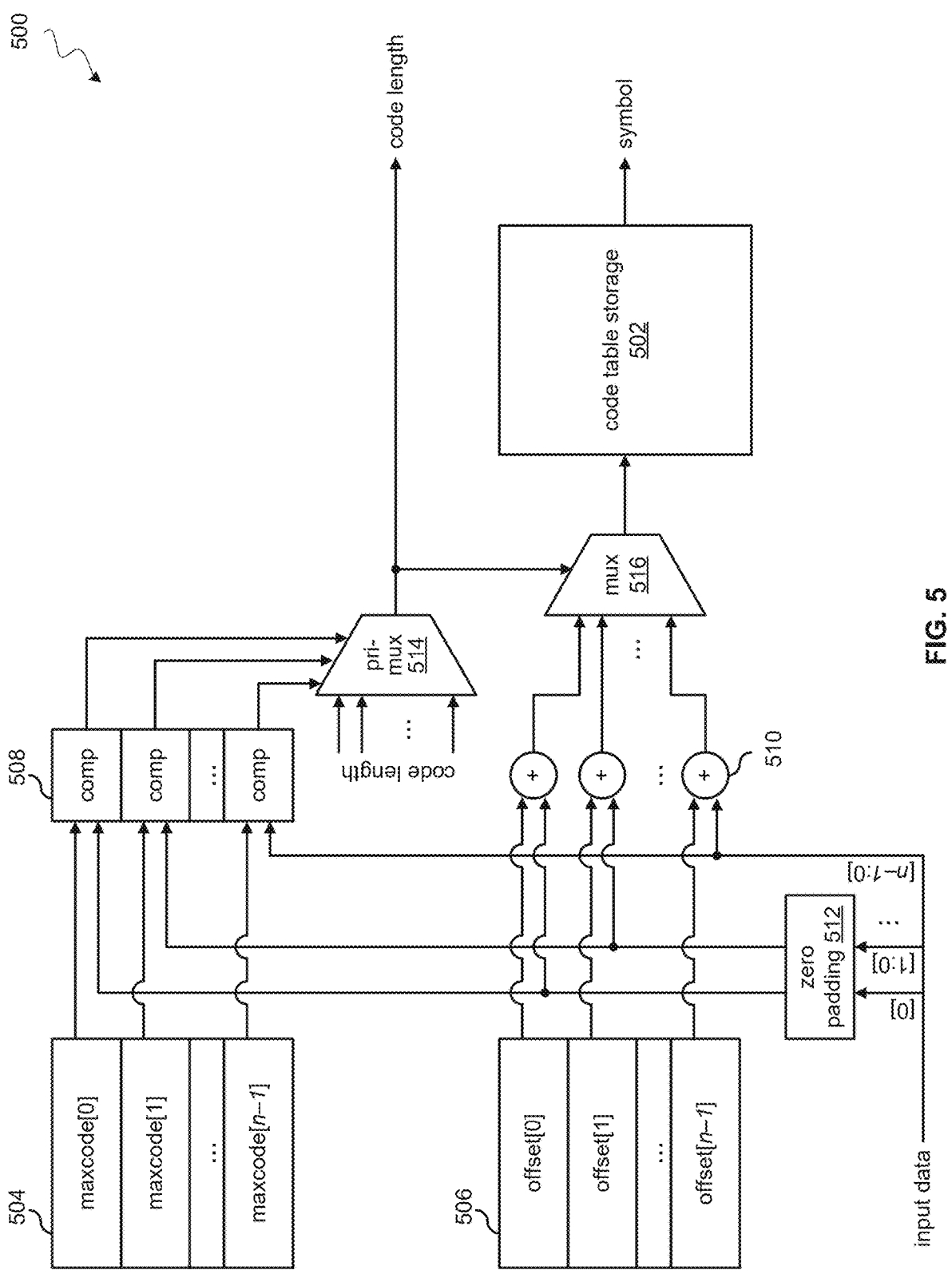
FIG. 5 illustrates a block diagram of an example of an integrated circuit.

FIG. 5 illustrates a block diagram of an example of an integrated circuit 500 that can be used to offload decoding operations from a processor. Integrated circuit 500 can be implemented, for example, as part of decoder acceleration circuitry 160 in decoder accelerator 150, and can be tailored to accelerate decoding of Huffman encoded data objects. In some implementations, given an input data stream, integrated circuit 500 is capable of decoding a code word every clock cycle. In other words, integrated circuit 500 can determine, in one clock cycle, a code symbol corresponding to a code in the input data. This provides a significant performance improvement as compared to software techniques which may take many clock cycles to recover a code symbol from encoded data.

Integrated circuit 500 may include a table storage subsystem for storing information associated with a code table (e.g., a Huffman table). The storage elements of the table storage subsystem can be implemented with flip-flops. The table storage subsystem may include code table storage 502, maximum code storage 504, and offset storage 506. Code table storage 502 can be used to store symbol entries each containing a code symbol. For example, if code table storage is being used to store a JPEG Huffman table, each symbol entry will contain a value representing the symbol S1, which is an 8-bit value with four bits indicating the number of preceding zeros of a non-zero coefficient (S2), and four bits indicating the bit length of the non-zero coefficient (S2) following the code in the input data. The symbol entries in code table storage 502 are arranged in ascending order of the code length and code value. Hence, the longest code with the largest value will correspond to the last entry in code table storage 502.

Maximum code storage 504 can be used to store the maximum value of each of the different code lengths. For example, maxcode[0] may store the maximum value for the shortest code length, and maxcode[n−1] may store the maximum value for the longest code length. Offset storage 506 can be used to store an offset value for each of the different code lengths. The offset value corresponding to a code length is a value that can be added to a code of that length to obtain an index value. This index valued is used to index into code table storage 502 to retrieve the code symbol mapped to the code.

To achieve single clock cycle decoding of the input data to obtain a code symbol per clock cycle, integrated circuit 500 includes a set of comparators 508 that are operable to concurrently compare the input data to each of the maximum values stored in maximum code storage 504. Each of the comparators 508 is comparing the maximum value for a particular code length to the input data of that bit length. For example, the 5 starting bits of the input data will be compared with the maximum value for 5-bit codes. If the 5 starting bits of the input data is larger than the maximum value for 5-bit codes, then the code contained in the input data will be at least 6 bits in length. If the 6 starting bits of the input data is larger than the maximum value for 6-bit codes, then the code contained in the input data will be at least 7 bits in length. But if the 6 starting bits of the input data is not larger than the maximum value for 6-bit codes, then it can be determined that the code contained in the input data is 6 bits in length. Hence, comparison of the input data to the maximum values is used to determine the code length of the code in the input data, and by performing the comparisons in parallel, the different code lengths can be checked simultaneously.

Integrated circuit 500 also includes a set of adders 510 that are operable to add the input data to each of the offset values stored in offset storage 506 in parallel to achieve single cycle decoding. Each of the adders 510 is adding the offset value for a particular code length to the input data of that bit length. In essence, the set of adders 510 are pre-computing the index values for the different code lengths without knowing the actual code length. To generate inputs with matching bit lengths for the comparators 508 and adders 510, the different bit lengths of the input data are padded with leading zeros by zero padding logic 512.

Once the code length is determined by the set of comparators 508, selection circuitry, which may include one or more selection circuits such as priority multiplexor 514 and/or multiplexor 516, can then select the index value corresponding to the determined code length. For example, the comparison results of the comparators 508 are provided to priority multiplexor 514 to select the code length determined for the code in the input data. The code length is then provided to multiplexor 516 to select the proper index value from the set of index values computed by the adders 510. The selected index value can then be used to index into code table storage 502 to obtain the symbol mapped to the code in the input value. The symbol obtained from code table storage 502 and the code length of the symbol are provided as outputs, which can be used to reproduce the decoded data and to determine the starting bit of the next code in the input data.

Figure 6:
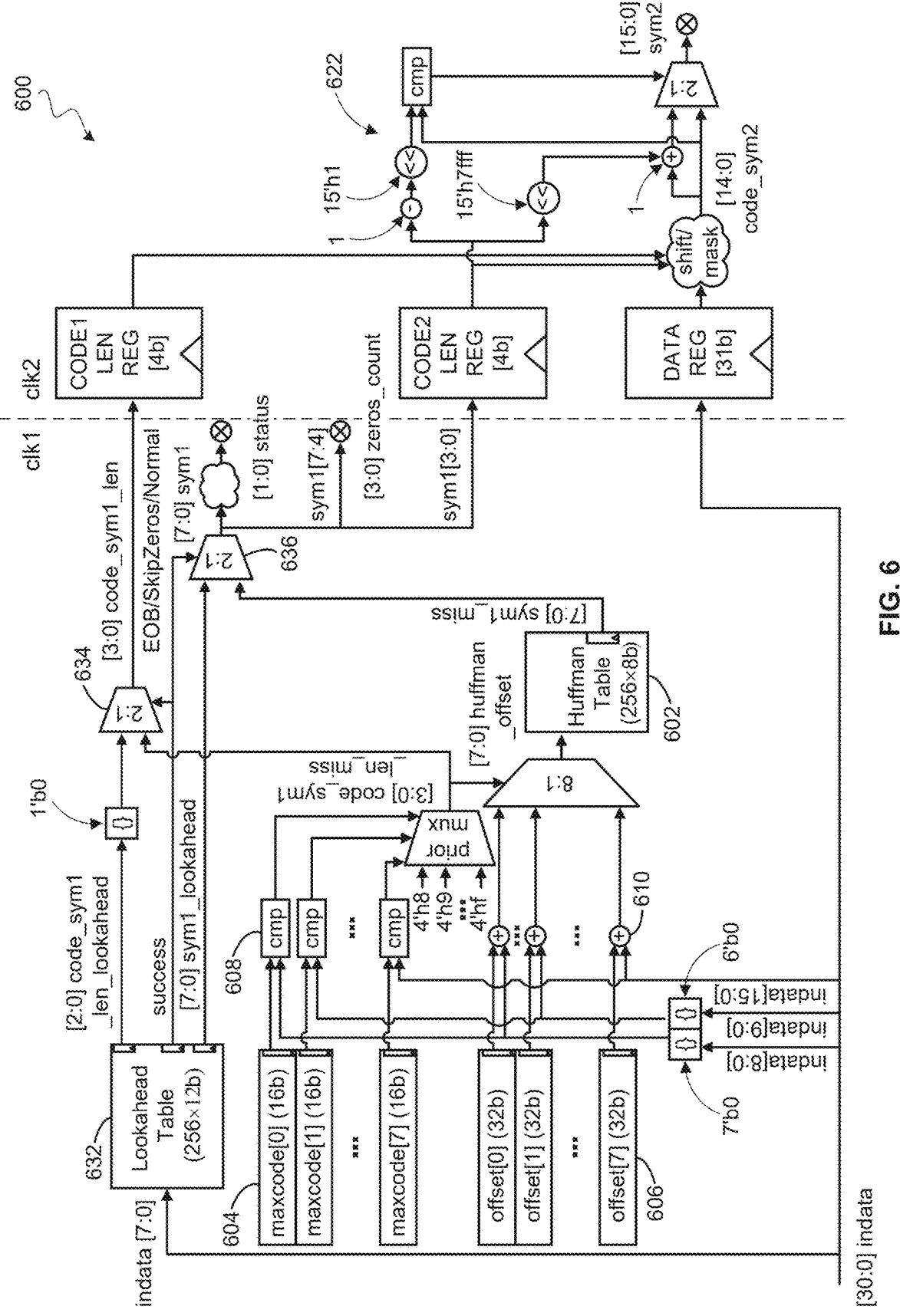
FIG. 6 illustrates a block diagram of another example of an integrated circuit.

FIG. 6 illustrates a block diagram of another example of an integrated circuit 600 that can be used to offload decoding operations from a processor. Integrated circuit 600 can be implemented, for example, as part of decoder acceleration circuitry 160 in decoder accelerator 150, and can be tailored to accelerate decoding of JPEG images. In some implementations, given an input data stream, integrated circuit 600 is capable of decoding a code word every clock cycle. In other words, integrated circuit 600 can determine, in one clock cycle, a code symbol corresponding to a code in the input data.

Image data from a JPEG file can be provided as input data into integrated circuit 600. In some implementations, byte destuffing logic may process the image data to remove stuffed bytes (e.g., 0x00 byte following the 0xFF marker) before providing the input data to integrated circuit 600. Similar to integrated circuit 500, integrated circuit 600 has a table storage subsystem, which can be implemented using flip-flops as storage elements. The table storage subsystem may include code table storage 602 (Huffman table), maximum code storage 604, offset storage 606, parallel comparators 608, and parallel adders 610. The operations of these components are similar to those discussed above, and thus a detailed description of which need not be repeated. In addition to these storage components, the table storage subsystem of integrated circuit 600 also includes a lookahead table storage 632.

Lookahead table storage 632 can be used to store lookahead entries corresponding to codes that are less than or equal to certain threshold code length. This allows the size of the code table storage 602 and its supporting circuitry (e.g., maximum code storage 604, offset storage 606, parallel comparators 608, and parallel adders 610) to be reduced. For example, the threshold code length can be 8 bits, and lookahead table storage 632 can be used as a lookup table to decode code lengths that are 8 bits or less, while the code table storage 602 and its supporting circuitry can be used to decode code lengths longer than 8 bits. Hence, if the maximum code length is 16 bits, the code table storage 602 only needs to store code symbols for code lengths longer than 8 bits. The size of the number of maximum code storage 604 and offset storage 606, and the number of comparators 608 and adders 610 can be reduced by half.

To use lookahead table storage 632 to decode code lengths of 8-bits or less, lookahead table storage 632 may include 256 lookahead entries to store code information for each of the 256 possible unique 8-bit sequence of input data. More generally, for a threshold code length of n bits, lookahead table storage 632 can have $2^n$ number of lookahead entries. The 8-bit sequence of the input data is used as an index to lookup a lookahead entry. The possible 8-bit sequences include bit sequences that contain 2-bit codes, 3-bit codes, etc. up to and including 8-bit codes. Some 8-bit sequences of input data will map to invalid symbols. These invalid 8-bit sequences correspond to input data containing a code that is longer than 8 bits.

Each lookahead entry for a bit sequence of the threshold code length that corresponds to a valid code contains a code symbol and a code length. For example, certain 8-bit sequences may contain a valid 3-bit code. The lookahead entry for these 8-bit sequences will contain the code symbol corresponding to the 3-bit code, and a code length indicating that the code in the 8-bit sequence is 3 bits long. For JPEG images, the code symbol is the 8-bit S1 symbol. It is also possible to have multiple lookahead entries that map to the same code symbol. For example, different 8-bit sequences may have the same starting 3 bits corresponding to a 3-bit code that maps to the same code symbol.

Each lookahead entry further includes a lookahead code hit indicator to indicate whether the input data corresponding to the entry in the lookahead table storage 632 contains a valid code. For example, the lookahead code hit indicator can be used to indicate the success of finding a valid code symbol in the lookahead table storage 632 for the 8-bit input data sequence. As mentioned above, certain input data bit sequences of the threshold code length may not map to a code symbol, because the bit sequence is part of a longer code word. Hence, the lookahead code hit indicator can be used to select between using the lookahead table storge 632 or the code table storage 602 as the source of the code symbol decoded from the input data.

Referring to FIG. 6, the lookahead code hit indicator is outputted from lookahead table storage 632 as a "success" signal. Selection circuitry such as multiplexor 636 can use this "success" signal to select a code symbol from the code table storage 602 or the lookahead table storage 632 based on input data to decode. Multiplexor 636 selects the code symbol from the code table storage 602 when a lookahead entry corresponding to the threshold code length number of bits (e.g., 8 bits) in the input data indicates that the threshold code length number of bits in the input data fails to map to a valid code symbol. In such instances, multiplexor 636 selects the code symbol from the code table storage 602 based on a comparison of the input data to maximum values stored in the maximum value storage 604 for different code lengths to determine a code length for the input data. The code symbol is selected from the code table storage using an index generated by adding an offset of the corresponding code length stored in offset storage 606 to the input data. Multiplexor 634 can also use the "success" signal to select between the code length being provided from an entry in the lookahead table storage 632 when a valid code is found in lookahead table storage 632, or from the comparison results of the maximum values stored in the maximum value storage 604.

As mentioned above, a code symbol (S1) can be obtained from the input data per clock cycle using integrated circuit 600. The determined S1 code symbol (which includes a 4-bit value (sym 1[7:4]) representing the number of leading zeros before a coefficient value (S2), a second 4-bit value (sym 1[3:0]) representing the bit length of the coefficient value (S2) following the code in the input data) can then be used to reproduce the decoded data. The S1 code symbol is first compared with the special symbols for end-of-block (0,0) and skip 16 zeros (15,0). If the S1 code symbol does not correspond to the special symbols, the S1 code symbol and the code length of the S1 code symbol are then provided to the next clock stage of the decoding logic.

The next clock stage of the decoding logic includes shift logic 622 to obtain the S2 coefficient value from the input data. The code length of the S1 code symbol is provided to shift logic 622 to determine the start bit of the S2 coefficient value. The start bit of the S2 coefficient value can be obtained by shifting the input data by the code length of the S1 code symbol. The bit length of the coefficient value as provided in the S1 symbol (sym[3:0]) can then be used to obtain the S2 coefficient value by shifting the input data by the S2 bit length. The S2 coefficient value is padded with leading zeros to fill 16 bits. An 8×8 JPEG block storage memory (e.g., implemented with flip-flops) can be initialized with zeros. The 16-bit S2 coefficient value can then be written at a location in the memory with an offset from the previous coefficient value, in which the offset corresponds to the number of leading zeros as provided in the S1 symbol (sym[7:4]).

Although integrated circuit 600 is shown with one table storage subsystem (which may include code table storage 602, maximum code storage 604, offset storage 606, and lookahead table storage 632), integrated circuit 600 may have multiple table storage subsystems. For example, integrated circuit 600 may include four table storage subsystems to accommodate code data for up to four Huffman tables that may be needed to decode a JPEG image. In some implementations, the four table storage subsystems can be used to store code information for an AC luminance Huffman code table, a DC luminance Huffman code table, an AC chrominance Huffman code table, and a DC chrominance Huffman code table, respectively. During operation, integrated circuit 600 can dynamically switch between the table storage subsystems being used to decode the input data based on the table sequence provided in the header of the JPEG image. By way of example, integrated circuit 600 may include a state machine that switches table storage subsystems at the beginning of a 8×8 JPEG data block to use a DC Huffman table, then switches to an AC Huffman table to decode the next code word and the subsequent code words until the decoded data reaches the end of the 8×8 JPEG data block. The state machine can be programmed with the table sequence for a MCU, which is repeated for each MCU of the JPEG image.

Referring back to FIGS. 1 and 2, a technique for decoding a JPEG image file using computing system 100 will now be described. Decoder acceleration circuitry 160 can be implemented using integrated circuit 600. Input FIFO 152 can be a 2-entry deep FIFO that stores 528-bit input packets, which includes 512 bits of input packet data and a 16-bit header. Output FIFO 156 can be a 4-entry deep FIFO that stores 520-bit output packets, which includes 512 bits of output packet data and 8-bit sideband information.

Processor 110 may start the JPEG decoding process by parsing a JPEG file to obtain a header including start-of-frame information, one or more quantization tables, and multiple Huffman code tables containing code symbols for decoding the JPEG image. Processor 110 can locate markers in the JPEG file to determine the different sections of the JPEG file to obtain such information. Processor 110 than sends a start packet that includes the MCU count of the JPEG image, the 8×8 data block count per MCU of the JPEG image, and the Huffman table sequence as determined from the start-of-frame information. The start packet may also include a start byte pointer to point to the first byte of encoded data in the first bitstream data packet to be sent, and a packet count. Decoder accelerator 150 can use the information in the start packet to initialize its counters and state machines for a new JPEG file.

Processor 110 may then load the Huffman code tables into the table storage subsystems of decoder accelerator 150.

Loading a Huffman code table may include loading the code table or a portion of the code table into code table storage 602. Loading a Huffman code table may also include loading a set of maximum values for different code lengths associated with the code table into maximum value storage 604, and a set of offset values for indexing the code table into offset storage 606. Loading a Huffman code table may also include loading a lookahead table associated with the code table into lookahead table storage 632. In some implementations, 13 load table packets may be used to load a Huffman code table. Each load table packet can be transmitted with a table identifier in the packet header to identify which of the four Huffman tables (e.g., AC or DC, luminance or chrominance) is being loaded. Because the code data for a Huffman code table are transmitted over multiple packets, the packet header for each load table packet may also include a table segment identifier to indicate which portion of the code data for the code table is being transmitted. Decoder accelerator 150 stores the code data information associated with each Huffman table into the respective table storage subsystem.

Processor 110 then transmits the encoded data of the JPEG file in bitstream data packets to decoder accelerator 150. Decoder accelerator 150 receives the encoded data of the JPEG file, and generates the decoded JPEG 8×8 data blocks using the Huffman code tables as described above. Decoder accelerator 150 then transmits the JPEG 8×8 data blocks in decoded data packets to processor 110 for further processing. As mentioned above, the output packets of decoder accelerator may include 512 bits of output packet data. Hence, each decoded data packet may correspond to half a JPEG data block, and two decoded data packets can be used to transmit one JPEG 8×8 data block (8×8×16 bits=1024 bits).

Processor 110 receives the decoded JPEG data blocks in the decoded data packets from the decoder accelerator 150, and may perform one or more post-processing on the decoded JPEG data blocks. For example, processor 110 may dequantize the decoded JPEG data blocks using the one or more quantization tables parsed from the JPEG file to generate the dequantized JPEG data blocks. Processor 110 may perform inverse discrete cosine transform on the dequantized JPEG data blocks to generate spatial JPEG data blocks, which are the pre-transformed JPEG data blocks. Processor 110 may perform color conversion on the spatial JPEG data blocks to generate the image data in the RGB color space from the JPEG file.

In some implementations, the post-processing performed by processor 110 can be performed using SIMD instructions to increase parallelism and throughput. However, the decoded data provided by decoder accelerator 150 may not necessarily be arranged in a manner to take full advantage of the SIMD instructions. For example, with 8×8 JPEG data blocks, if the architecture of processor 110 supports 16×SIMD parallel computations, a single row of a JPEG data block (having 8 data elements) may not be able to fill up the full 16×SIMD parallel computation paths supported by processor 110.

Figure 7:
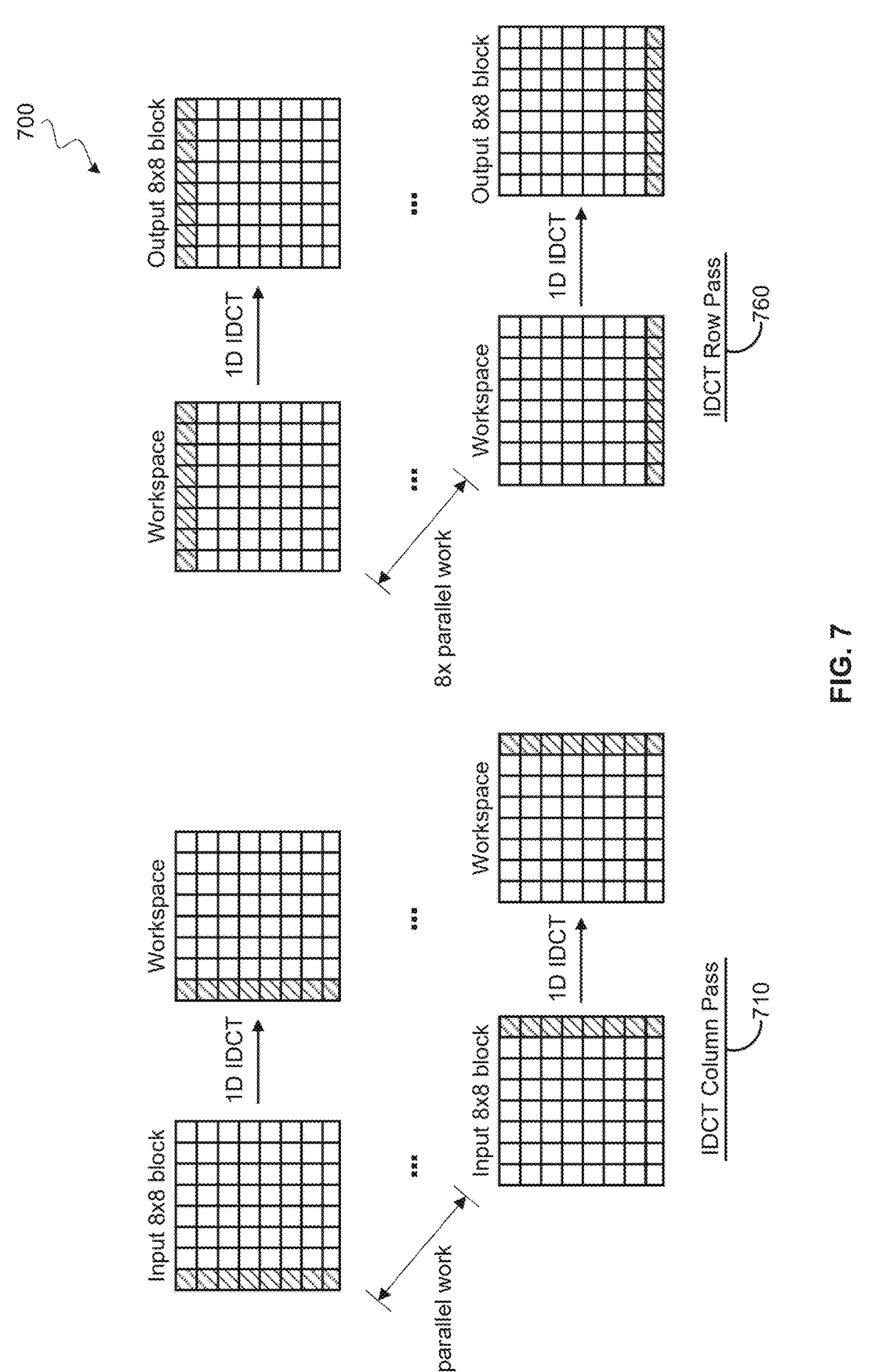
FIG. 7 illustrates a conceptual diagram of an example of an inverse transform.

By way of example, FIG. 7 illustrates an example of an inverse discrete cosine transform (IDCT) 700, which is one of the post-processing operations that can be performed on a decoded 8×8 JPEG input data block. The IDCT is a 2-dimensional inverse transform, and the 2-D IDCT can be decomposed into two 1-dimensional IDCT operations by first transforming all the columns by a 1-D IDCT transform (column pass 710), and then applying a 1-D IDCT transform to the rows of the transformed columns (row pass 760).

With respect to column pass 710, the computations performed on each column can be performed in parallel. Hence, the structure of the data block lends itself to 8× parallel computational paths during the IDCT column pass because there are 8 columns in the data block. Similarly, for row pass 760, the computations performed on each row can be performed in parallel. Hence, the structure of the data block lends itself to 8× parallel computational paths because there are 8 rows in the data block. However, row pass 760 may not be performed until after column pass 710 is complete. As such, it may not be possible to parallelize row pass 760 together with column pass 710. Accordingly, performing IDCT on one 8×8 JPEG data block may only allow up to 8× parallel computation paths. In order to take full advantage of the SIMD instructions supported by processor 110, multiple JPEG data blocks can be fused to increase parallelism and throughput. For example, if processor 110 supports 16×SIMD computations, two 8×8 JPEG data blocks can be fused to provide 16× parallel computation paths. More generally, for a processor that supports SIMD instructions operating on N data elements concurrently, M number of JPEG data blocks can be fused together for concurrent processing, where M is an integer quotient of N/8.

To merge the JPEG data blocks and to arrange the data to take advantage of the full parallelism of the SIMD instructions supported by processor 110, machine instructions tailored for the post-processing operations can be implemented. The machine instructions can be implemented as part of the native instruction set architecture (ISA) of processor 110 when designing processor 110, or can be implemented using custom machine instructions in processor architectures with configurable processor cores. It should be noted that the machine instructions being implemented are low level machine code that are read and executed by processor 110. For example, each of the machine instruction described can be stored in one instruction entry in the instruction queue of the processor, and the functionality described for each individual machine instruction can be achieved with the processor executing the single machine instruction.

Figure 8:
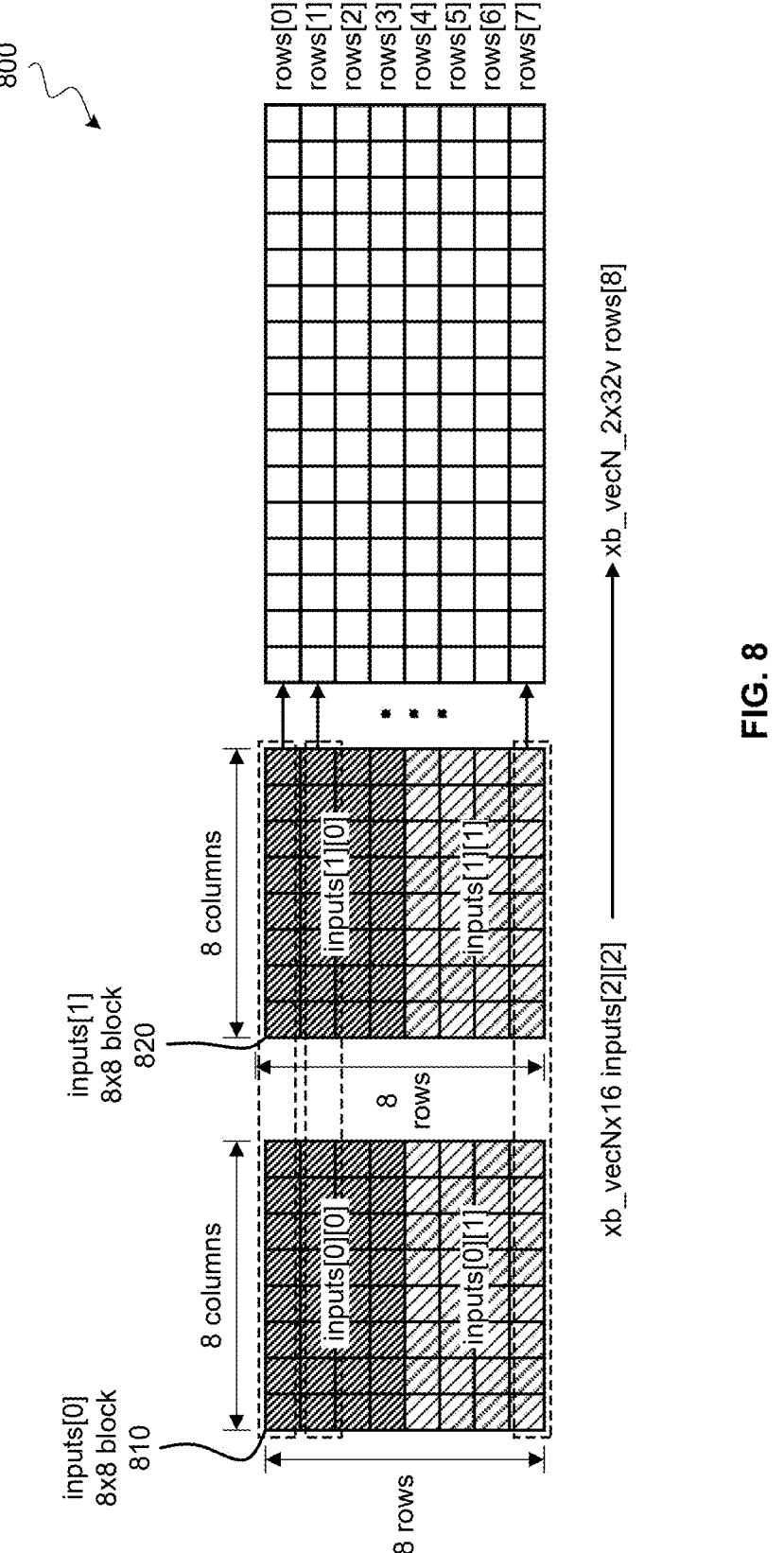
FIG. 8 illustrates a conceptual diagram of an example of a fuse input machine instruction.

FIG. 8 illustrates a conceptual diagram 800 of an example of the operation of a machine instruction for merging data blocks to prepare parallel data for SIMD computations. The machine instruction for merging the data blocks can be a fuse input instruction (FI) that takes a first FI input vector, a second FI input vector, and a FI select input, and generates a first FI output vector and a second FI output vector. The fuse input instruction may select a portion of the first FI input vector and a portion of the second FI input vector based on the FI select input, sign extend the selected portion of the first FI input vector and the selected portion of the second FI input vector (e.g., if the data elements have a different bit length than the supported SIMD computations), and shuffle data elements of the sign extended portion of the first FI input vector with data elements of the sign extended portion of the second FI input vector to generate the first and second FI output vectors. The data shuffle can be performed on a group basis such that a group of data elements (e.g., eight contiguous data elements) are kept together.

For example, two 8×8 data blocks 810 and 820 are shown in FIG. 8. Each element in the data block can be a 16-bit value (e.g., a decoded coefficient value). The first data block 810 (inputs[0]) may include data transmitted from decoder accelerator 150 to processor 110 via two decoded data packets. The data from the first decoded data packet may correspond to the top four rows of the inputs[0] data block 810 and be stored in a 512-bit vector inputs[0][0]. The data from the second decoded data packet may correspond to the bottom four rows of the inputs[0] data block 810 and be stored in a 512-bit vector inputs[0][1]. Similarly, the second data block 820 (inputs[1]) may include data transmitted from decoder accelerator 150 to processor 110 via two decoded data packets. The data from the first decoded data packet may correspond to the top four rows of the inputs[1] data block 820 and be stored in a 512-bit vector inputs[1][0]. The data from the second decoded data packet may correspond to the bottom four rows of the inputs[1] data block 820 and be stored in a 512-bit vector inputs[1][1].

The fuse input instruction can be executed on the input vectors to merge each row of data block 810 with the corresponding row of data block 860. The select input to the fuse input instruction can be used to select which portions of the input vectors to operate on. For instance, executing the fuse input instruction on inputs[0][0] and inputs[1][0] with a select input of 0 may select the first two rows of inputs[0][0] and the first two rows of inputs[1][0], sign extend the 16-bit data elements to 32 bits, and shuffle the selected row segments of inputs[0][0] and inputs[1][0] to generate output vectors rows[0] and rows[1].

Figure 9:
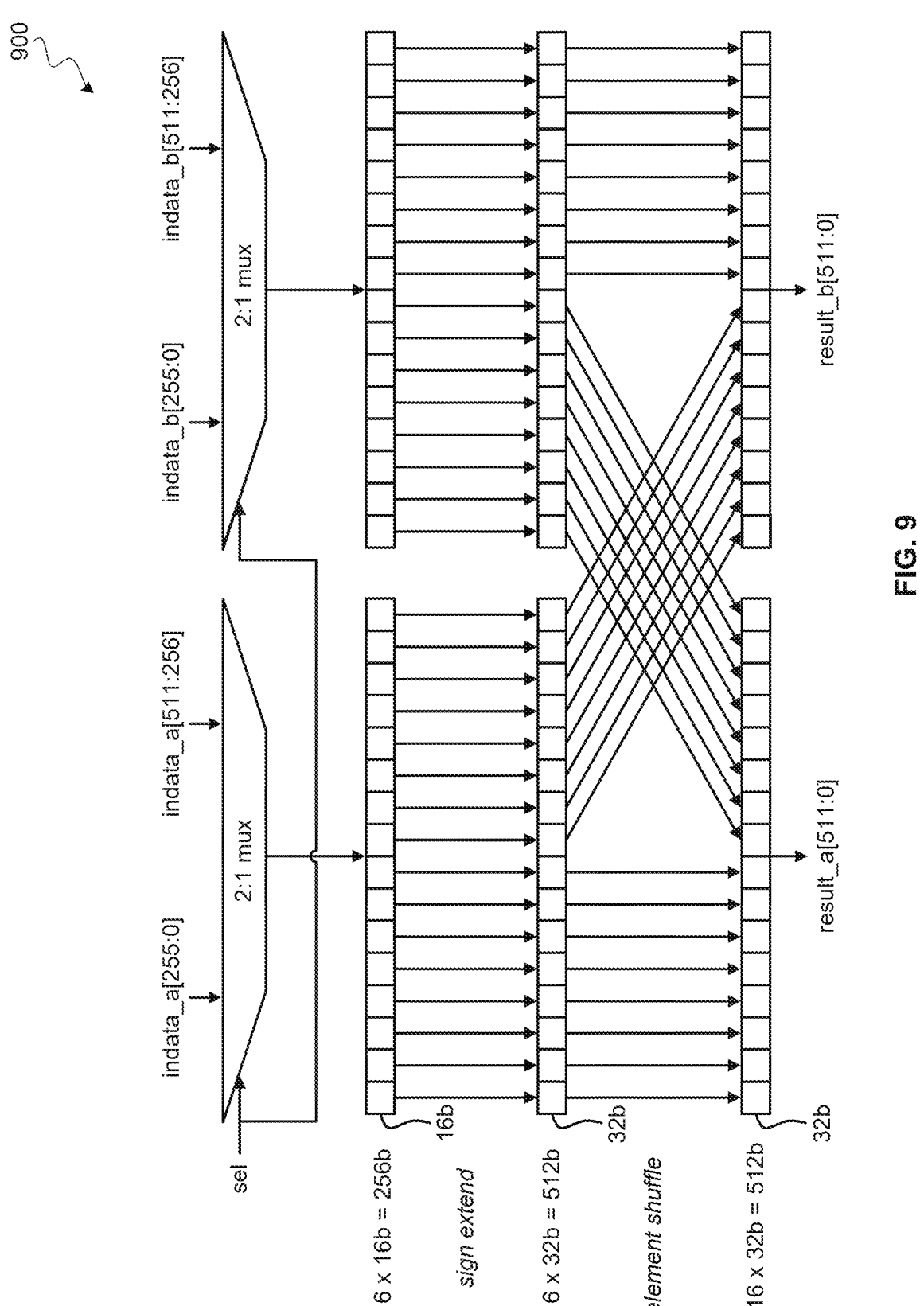
FIG. 9 illustrates a block diagram of example logic to implement a fuse input machine instruction.

FIG. 9 illustrates a block diagram of an example of the fuse logic circuitry 900 that can be used to implement the fuse input instruction. Continuing with the example above, applying inputs[0][0] as the 512-bit input vector indata_a [511:0], inputs[1][0] as the 512-bit input vector indata_b [511:0], and 0 as select input, the fuse logic circuitry 900 may select indata_a[255:0] corresponding to the two rows of inputs[0][0] (sixteen 16-bit elements) and indata_b[255:0] corresponding to the two rows of inputs[1][0] (sixteen 16-bit elements) using the two 2:1 muxes. Each 16-bit element can be sign extended to a 32-bit element. Elements of the sign extended portions of the input vectors are then shuffled to generate the output vectors result_a[511:0] and result_b [511:0]. For example, elements 9 to 16 of the sign extended selected portion of indata_a can be shuffled with elements 1 to 8 of the sign extended selected portion of indata_b. Accordingly, result_a[511:0] is generated by concatenating the sign extended elements 1 to 8 of the selected portion of indata_a with the sign extended elements 1 to 8 of the selected portion of indata_b; and result_b[511:0] is generated by concatenating the sign extended elements 9 to 16 of the selected portion of indata_a with the sign extended elements 9 to 16 of the selected portion of indata_b. Result_a[511:0] corresponds to rows[0] of the fused block in FIG. 8, and result_b[511:0] corresponds to rows[1] of the fused block in FIG. 8. When the select input is 1, the operations are performed on the other half of the input vectors to generate rows[2] and rows[3] of the fused block in FIG. 8. As each call to the fuse input instruction can fuse two rows of the data blocks, four fuse input instructions can be executed to fuse the two 8×8 data blocks to generate eight rows of 512-bit vectors representing sixteen columns of eight 32-bit data elements in each column. The IDCT column pass can then be performed on the fused data block (which includes two 8×8 data blocks) to process the 16 columns in parallel using 16×SIMD instructions.

Next, to complete the 2-D IDCT operation, a IDCT row pass is performed on the transformed columns generated by the IDCT column pass. To invoke the SIMD instructions to perform the IDCT row pass on the output of the IDCT column pass, the transformed columns of the two fused 8×8 data blocks are transposed within the 8×8 data blocks. To facilitate the transpose operation in processor 110, the IDCT column pass output data from the vector register file in processor 110 are loaded in a workspace in processor 110.

The workspace can be implemented, for example, using state registers of processor 110.

Figure 10:
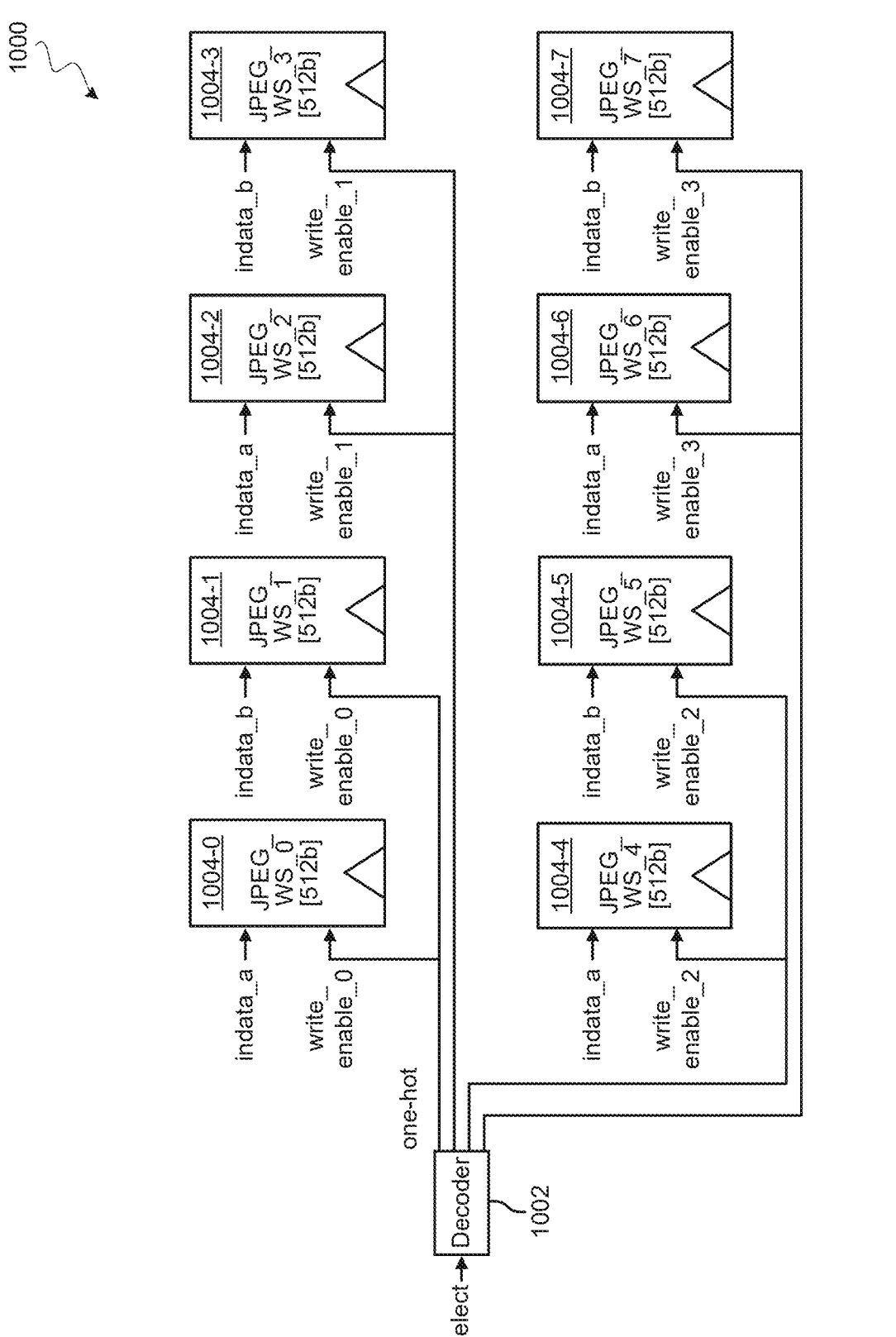
FIG. 10 illustrates a block diagram of example logic to implement a vector-to-workspace machine instruction.

FIG. 10 illustrates a block diagram of an example of the load workspace circuitry 1000 that can be used to implement the operation of a machine instruction for loading data from the vector register file to a workspace of a processor. The workspace can be implemented using state registers of the processor. The machine instruction for loading data into the workspace can be a vector-to-workspace instruction (VW) that takes a first VW input vector, a second VW input vector, and a VW select input. The vector-to-workspace instruction decodes the VW select input, and stores the first and second VW input vectors into respective workspace registers of the processor selected by the decoded VW select input. Hence, each execution of the vector-to-workspace instruction loads a pair of input vectors into a pair of workspace registers.

The load workspace circuitry 1000 may include a decoder 1002 and multiple workspace registers. In the example shown, load workspace circuitry 1000 includes eight workspace registers 1004-0 to 1004-7. Each of the workspace registers can be implemented using a 512-bit state register. Decoder 1002 is operable to perform one-hot decoding of the select input. For example, decoder 1002 converts a 2-bit select signal into a 4-bit one-hot signal. The 4-bit on-hot signal is used as a write enable for the workspace registers. Each bit of the 4-bit one-hot signal is used as the write enable for two of the workspace registers. Thus, each execution of the vector-to-workspace instruction loads the two input vectors respectively into two of the eight workspace registers. To load the result of the IDCT column pass (which has eight rows of 512-bit data) into eight workspace registers, four vector-to-workspace instructions can be executed to store the data corresponding the two 8×8 data blocks into the workspace registers.

Figure 11:
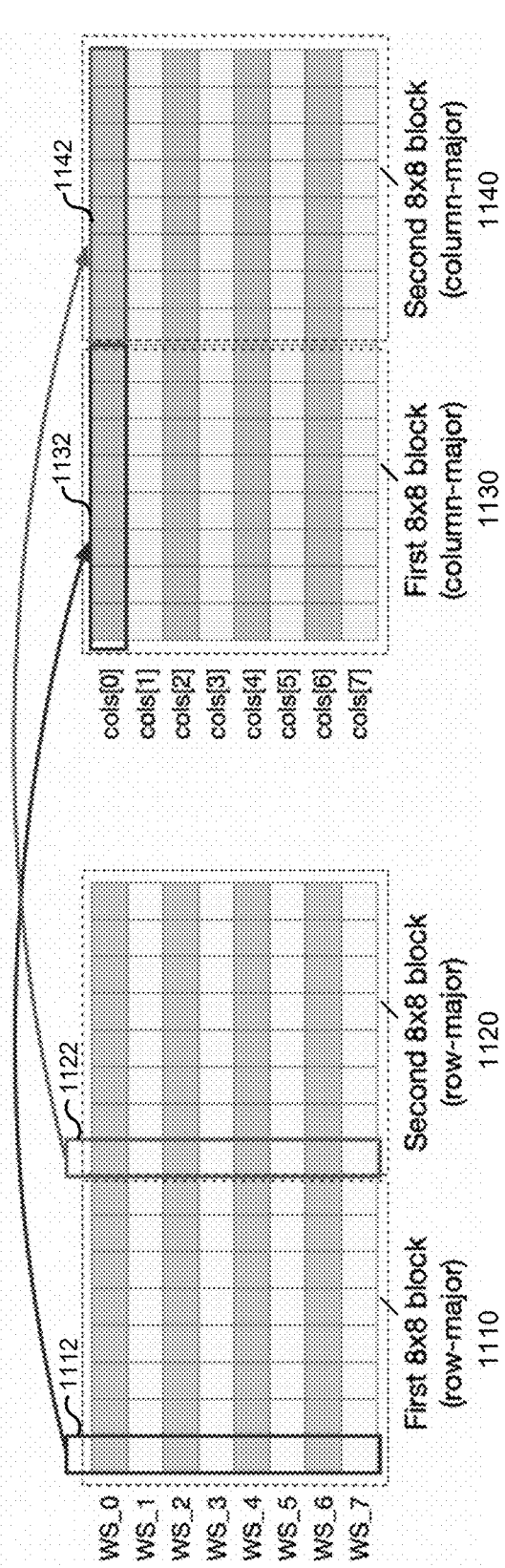
FIG. 11 illustrates a conceptual diagram of an example of a workspace-to-vector machine instruction.

FIG. 11 illustrates a conceptual diagram 1100 of an example of the operation of a machine instruction for transposing columns of a fused data block with the individual data blocks. The machine instruction for the transpose operation can be a workspace-to-vector instruction (WV) having a WV select input, a first WV output vector, and a second WV output vector. The workspace-to-vector instruction may select data elements at the same index of different workspace registers of the processor based on the WV select input, and stores the selected data elements from the different workspace registers into the first and second WV output vectors.

Referring to FIG. 11, applying cols[0] and cols[1] as the first and second WV output vectors, and 0 as the WV select input, the workspace-to-vector instruction selects the first data element from each of the workspace registers WS_0 to WS_7, and stores them as data elements 1 to 8 of cols[0], and selects the ninth data element from each of the workspace registers WS_0 to WS_7, and stores them as data elements 9 to 16 of cols[0]. The effect of this operation is to transpose column 1112 in the first row-major 8×8 data block 1110 to row 1132 in the first column-major 8×8 block 1130, and transpose column 1122 in the second row-major 8×8 block 1120 to row 1142 in the second column-major 8×8 data block 1140 as highlighted in FIG. 11. The same workspace-to-vector instruction also selects the second data element from each of the workspace registers WS_0 to WS_7, and stores them as data elements 1 to 8 of cols[1]; and selects the tenth data element from each of the workspace registers WS_0 to WS_7, and stores them as data elements 9 to 16 of cols[1].

Hence, a single execution of the workspace-to-vector instruction produces two rows of the fused column-major data block. To produce the two fused column-major data blocks 1130 and 1140, four workspace-to-vector instructions can be executed to transpose the two fused row-major data blocks 1110 and 1120. Each column of the fused column-major data blocks 1130 and 1140 corresponds to one row in one of the pre-transposed 8×8 data blocks. The IDCT row pass can then be performed by processing the 16 columns of the two fused column-major data blocks 1130 and 1140 in parallel using 16×SIMD instructions, which has the effect of processing the 16 rows of data in the pre-transposed 8×8 data blocks in parallel.

The results of the IDCT row pass, which is the output of the 2-D IDCT, may remain in the column-major arrangement in the workspace registers. Each of the output 8×8 data block of the 2-D IDCT can be stored into a 2-D image buffer in preparation for subsequent processing such as up-sampling and color space conversion. Therefore, different rows of an 8×8 block may need to be stored back to system memory in a stride of the image width, whereas the two different 8×8 blocks might come from different color components and need to be stored to different image buffers. A machine instruction can be used to store the column-major data blocks into system memory (e.g., DRAM) as 8×8 row-major data blocks.

Figure 12:
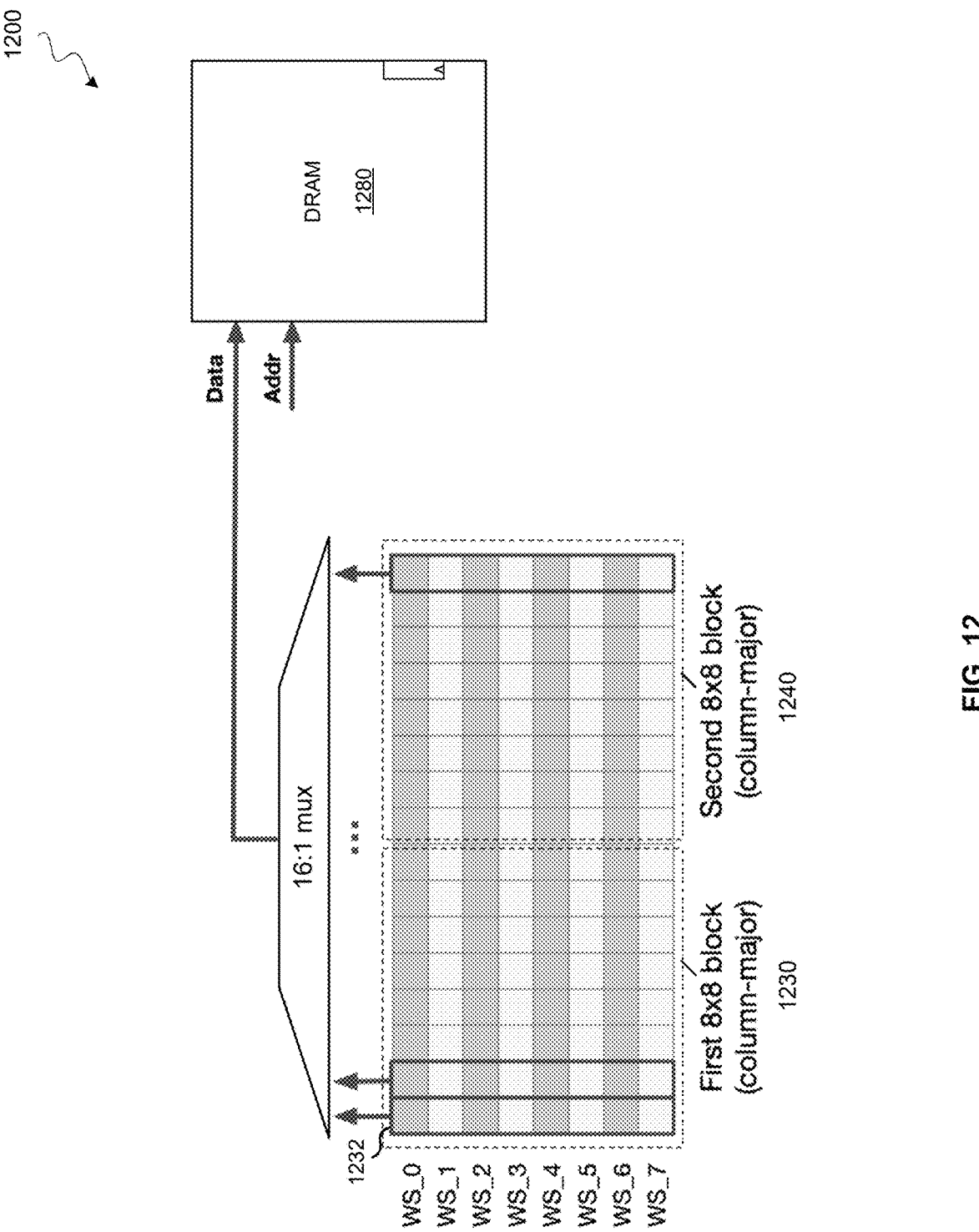
FIG. 12 illustrates a conceptual diagram of an example of a saturate-and-store machine instruction.

FIG. 12 illustrates a conceptual diagram 1200 of an example of the operation of a machine instruction for storing the column-major blocks into system memory. The machine instruction for storing the column-major blocks into system memory can be a saturate-and-store instruction (SS) having a SS base address input, an SS offset input; and a SS row select input. The saturate-and-store instruction may select a set of data elements at the same index from the different workspace registers based on the SS row select, saturate the set of selected data elements by setting data elements having a value greater than a threshold value to the threshold value and setting data elements that are less than zero to zero, and store the saturated set of selected data elements at a location in system memory based on the SS base address input and the SS offset input.

A single execution of the saturate-and-store instruction selects the data elements belonging to one row of an 8×8 data block from the workspace registers, and places the data elements into system memory. For example, referring to FIG. 12, a single execution of the saturate-and-store instruction may select the first data element from each of the workspace registers WS_0 to WS_7 (shown as column 1232), saturate the values (e.g., replace any value greater than 255 with 255), and write the saturated set of data elements into one row of an 8×8 data block in DRAM 1280. Hence, to store the two 8×8 column-major data blocks 1230 and 1240 into system memory, sixteen saturate-and-store instructions can be executed. Additional post-processing operations such as up-sampling and color space conversion can be performed on the 8×8 data blocks using SIMD instructions.

Figure 13:
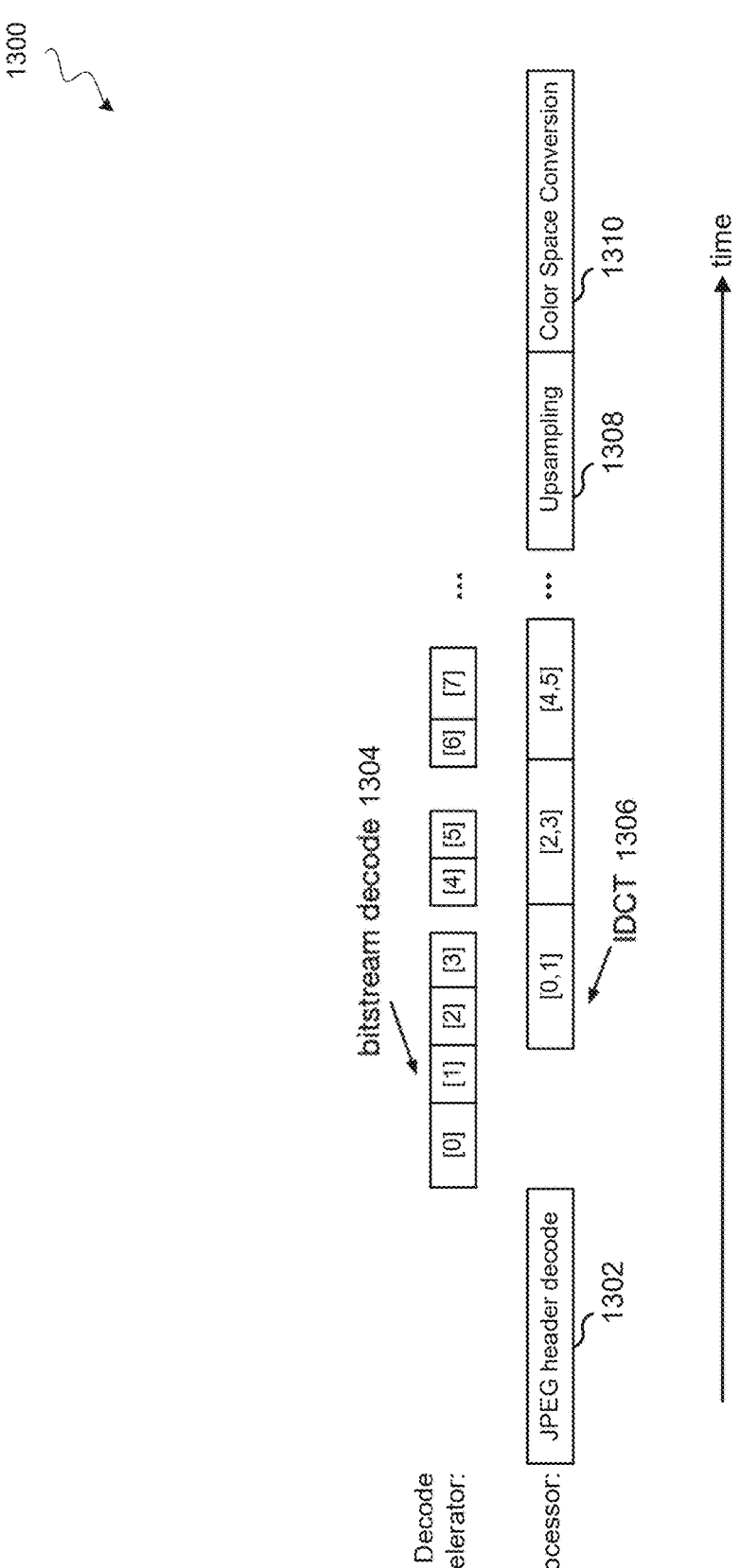
FIG. 13 illustrates a timing diagram of an example of a decoding process.

FIG. 13 illustrates a timing diagram of an example of a JPEG image decode process 1300 being performed by a computing system. The computing system can be, for example, computing system 100, and may include a processor and a decoder accelerator. The JPEG image decoding process 1300 can be subdivided into various tasks including header decoder 1302, bitstream decode 1304, inverse discrete cosine transform (IDCT) 1306, up-sampling 1308, and color space conversion 1310. Depending on the encoding processed used to generate the JPEG image, the JPEG image decoding process 1300 may include addition tasks not specifically shown such as de-quantization, and/or may omit certain tasks such as up-sampling.

As shown in FIG. 13, the processor can be configured to perform header decode 1302, IDCT 1306, up-sampling 1308, and color space conversion 1310, while offloading the bitstream decode 1304 to a decoder accelerator. The bitstream decode 1304 can be offloaded to the decoder accelerator once the header has been parsed, and the code tables that may be needed to decode the encoded JPEG data has been provided to the decoder accelerator. Each of the enumerated blocks in FIG. 13 refers to an 8×8 JPEG data block. As discussed above, to take full advantage of the SIMD instructions supported by the processor, two JPEG data blocks can be fused together for concurrent processing during the post-decode operations (e.g., IDCT 1306, up-sampling 1308, and color space conversion). As such, as soon as two JPEG data blocks have been decoded by the decoder accelerator, the post-processing performed by the processor using SIMD instructions can be initiated. This allows the bitstream decode 1304 to be pipelined with IDCT 1306 by two JPEG data blocks deep. In this manner, the processor can perform IDCT on a set of JPEG data blocks in parallel with the decoder accelerator decoding another set of JPEG data blocks. This also allows the latency of the bitstream decode to be hidden behind IDCT. Bitstream decode 1304 and IDCT 1306 are the most time consuming part of the JPEG image decode process, and in some instances, can take up at least two-thirds of the processing time. By parallelizing these two time consuming processes, the overall JPEG image decode time can be significantly reduced.

FIG. 14 illustrates a flow diagram of an example of a process 1400 for decoding data. Process 1400 can be performed, for example, by a processor (e.g., processor 110). The processor may include one or more processor cores and may support SIMD instructions. To support SIMD instructions, the processor may include an execution unit that has multiple computation data paths (e.g., can be implemented using parallel ALUs). In some implementations, the processor may include configurable cores that can be programmed to executed custom instructions. The processor can be coupled to a decoder accelerator (e.g., hardware circuitry) to offload certain decoding operations via a decoder bus interface. In some implementations, the decoder bus interface can be a packetized interface that supports various packet types.

Process 1400 may begin at block 1402 by parsing a header including one or more code tables from a compressed data object. The compressed data object may include various markers (e.g., 2-byte marker that starts with 0xFF) to indicate different sections of the data object, and such markers can be used to extract the header from the compressed data object. In addition to one or more code tables, the header may also a table sequence to indicate the sequence of code tables to use to decode the compressed data object. In some implementations, the header may also include one or more quantization tables that can be used to dequantize the compressed data object. By way of example, the compressed data object can be a JPEG image file, and the code tables can be Huffman code tables.

At block 1404, code data for one or more code tables parsed from the header can be loaded into the decoder accelerator. The code data associated with a code table (e.g., Huffman code table) can be transmitted from the processor in load table packets. Each load table packet can be transmitted with a table identifier to indicate which code table in the decoder accelerator is being loaded. For example, the table identifier may indicate whether the table being loaded is associated with an AC component or a DC component, and may indicated whether the code table being loaded is associated with certain color space component such as luminance or chrominance.

The code data for a particular code table can be transmitted over multiple load table packets, and each load table packet can be transmitted with a table segment identifier to indicate which portion of code data is being transmitted. In some implementations, loading the code data for a code table may include loading a lookahead table associated with the code table, a set of maximum values for different code lengths, and a set of offset values used for indexing into the code table. In some implementations, prior to sending the load table packets, the processor may send a start packet to initialize the decode accelerator and to indicate the start of a new compressed data object (e.g., a new JPEG image file).

At block 1406, encoded data from the compressed data object can be provided to the decoder accelerator. The encoded data (e.g., data from JPEG image file) can be transmitted from the processor in a series of bitstream data packets. By transmitting the encoded data from the processor to the decoder accelerator, the decoding operations can be offloaded from the processor to the decoder accelerator. The decoder accelerator may include circuitry tailored for serialized data decoding such as decoding data that were encoded using entropy encoding (e.g., Huffman encoding).

At block 1408, decoded data blocks can be received from the decoder accelerator. The decoded data blocks can be, for example, data blocks having a predetermined size such as a 8×8 JPEG data block. Each data block may include DC and AC coefficients that were decoded by the decoder accelerator using the code tables. For example, a 8×8 data block may include a DC coefficient as the first data element followed by 63 AC coefficients in ascending order of frequency component arranged in a zigzag sequence in the 8×8 data block. In some implementations, each decoded data block can be received via multiple decoded data packets (e.g., two decoded data packets per data block). The processor may then perform various post-processing operations on the decoded data blocks. The processor may execute SIMD instructions for the post-processing operations to increase parallelism and throughput.

At block 1410, the processor may generate pre-transformation data blocks based on the decoded data blocks by performing inverse domain transformation. For example, the processor may perform inverse discrete cosine transform (IDCT) on the decoded data blocks to generate spatial data blocks (e.g., 8×8 spatial JPEG data blocks). In some implementations, certain machine instructions can be implemented to facilitate performing the inverse domain transformation using SIMD instructions. For example, machine instructions can be implemented to fuse the input data blocks to fill the SIMD parallel width, and to transpose the data for the inverse domain transformation. In some implementations, the inverse domain transformation can be performed by the processor on a set of data blocks in parallel with the decoder accelerator decoding another set of data blocks. In some implementations, the decoded data blocks can be dequantized using one or more quantization tables prior to the inverse domain transform.

At block 1412, the pre-transformation data blocks can be converted into the decompressed data object. For example, color space conversion can be performed on the 8×8 spatial JPEG data blocks in the YCbCr color space to generate image data in the RGB color space. In some implementations, up-sampling can be performed prior to color space conversion. Such post-decoding processing steps to recover the decompressed data object (e.g., image from a JPEG file) can be performed using SIMD instructions.

FIG. 15 illustrates a flow diagram of another example of a process 1500 for decoding data. Process 1500 can be performed, for example, by a decoder accelerator (e.g., decoder accelerator 150). The decoder accelerator may communicate with a processor via a decoder bus interface. In some implementations, the decoder bus interface can be a packetized interface that supports various packet types. The decoder accelerator may include circuitry tailored to perform serialized decoding such as decoding of data encoded using entropy encoding. In some implementations, the decoder accelerator can be a Huffman decoder. The Huffman decoder can be used to accelerate, for example, JPEG image file decoding.

Process 1500 may begin at block 1502 by storing code data associated with code tables provided from a processor via the decoder bus interface. The code data can be received in load table packets, and the code data associated with a code table (e.g., Huffman code table) may include code symbols for storing in a code table, maximum values for different code lengths, and offset values for different code lengths used for indexing into the code table. The code data may also include a lookahead table. The decoder accelerator may use a table identifier and a table segment identifier in the load table packets to store the code data into the appropriate location in the table storage subsystem for the associated code table. The decoder accelerator may also store a table sequence provided by the processor in a start packet to indicate the sequence of code tables to use to decode data blocks.

At block 1504, encoded data from the processor can be received via the decoder bus interface. The encoded data (e.g., data from JPEG image file) can be received from the processor in a series of bitstream data packets. The encoded data are provided to the internal decoder acceleration circuitry of the decoder accelerator for processing. At block 1506, the decoder acceleration circuitry may generate decoded data blocks using the code tables. In some implementations, the decoder acceleration circuitry can recover a code symbol from the encoded data in each clock cycle. At block 1508, decoded data blocks can be transmitted back to the processor. Each decoded data block (e.g., 8×8 JPEG data block) can be transmitted over multiple decoded data packets. In some implementations, the decoder acceleration circuitry may generate the decoded data blocks while the processor is performing post-processing operations on previous decoded data blocks provided from the decoder accelerator.

FIG. 16 illustrates a flow diagram of a further example of a process 1600 for decoding data. Process 1600 can be performed, for example, by the decoder acceleration circuitry of a decoder accelerator (e.g., decoder accelerator 150). In some implementations, process 1600 can be performed as part of block 1506 in process 1500, and can be performed as part of a JPEG image decoding process.

Process 1600 may begin at block 1602 by loading code symbols associated with different code lengths into a code table. In addition to the code symbols, maximum values and offset values for the different code lengths can also be loaded. In some implementations, a code symbol may include a first value representing the number of leading zeros before a coefficient value, and a second value representing the bit length of the coefficient value following the code in the input data.

At block 1604, input data containing a code to decode is received. In some implementations, byte destuffing can be performed prior to decoding. The decoder acceleration circuitry may determine, in one clock cycle, a code symbol corresponding to the code in the input data. To determine a code symbol in one clock cycle, different bit lengths of the input data can be compared to maximum values for the different corresponding code lengths at block 1606, and an index for selecting an entry in the code table can be generated by adding the input data to an offset based on results of the concurrent comparisons at block 1608. Additional details of the decoding process have been described above with reference to FIG. 5, and thus a detailed description of which need not be repeated.

In some implementations, the code symbols loaded into the code table may correspond to codes greater than a threshold code length, and process 1600 may also load lookahead entries into a lookahead table, in which the lookahead entries correspond to codes less than or equal to the threshold code length. For codes that are less than or equal to the threshold code length, the code symbol can be determined by determining whether a bit sequence of the input data of the threshold code length matches a valid code in the lookahead table. The code symbol is selected from the lookahead table when the input data matches a valid code symbol in the lookahead table. Otherwise, the code symbol is selected from the code table when the input data does not match a valid code in the lookahead table.

The code symbol determined from the input data can then be used to obtain the coefficient value in the input data. The coefficient value can be written at a location in memory with an offset from a previous coefficient value, in which the offset corresponds to the number of leading zeros as indicated in the code symbol. The decoding process can be used to fill in the data elements of a decoded data block such as a 8×8 JPEG data block. In some implementations, multiple code tables may be needed to decode a data block. In such implementations, the decoder acceleration circuitry may switch between code tables and their associated code data (e.g., maximum values, offset values, lookahead entries) based on a table sequence depending on which data element in the data block and/or which data block is being decoded.

FIG. 17 illustrates a flow diagram of an example of a process 1700 for processing data. Process 1700 can be performed, for example, by a processor (e.g., processor 110). In some implementations, process 1700 can be performed as part of block 1410 in process 1400, and can be performed as part of an IDCT operation when processing a JPEG image. At block 1702, a set of machine instructions is retrieved from an instruction queue of the processor by an execution unit of the processor. At block 1704, each of the machine instructions is executed on the processor. In some implementations, the machine instructions can be retrieved and executed one after another. The machine instructions may include instructions from the instruction set architecture (ISA) of the processor, and may include single instruction multiple data (SIMD) instructions. The machine instructions may also include machine instructions tailored for decoding acceleration, which can be used to prepare data to take full advantage of the SIMD instructions. Process 1700 may execute one or more machine instructions shown in the instruction queue of FIG. 18.

FIG. 18 illustrates an example of an instruction queue 1800 with machine instructions to perform an inverse discrete cosine transform (IDCT) operation. The IDCT operation can be part of the processing performed to render a JPEG image. It should be understood that the set of machine instructions may include additional machine instructions not specifically shown, and may include intervening machine instructions between the different groups of machine instructions and/or within any of the groups of machine instructions. It should also be noted that although the set of instructions are described with reference to performing an IDCT operation, similar machine instructions can be used to perform other types of inverse domain transform.

The set of machine instructions in instruction queue 1800 may include a set of fuse input instructions 1802 to fuse multiple data blocks together to expand the data blocks to the full SIMD width of the processor. For example, the processor may support SIMD instructions that operate on 16 data elements concurrently, and two 8×8 data blocks can be fused together to provide 16 columns of data for concurrent processing. In some implementations, four fuse input instructions can be executed to fuse two data blocks. Depending on the SIMD capabilities of the processor, more than two data blocks can be fused together, and additional fuse input instructions may be executed to fuse more than two data blocks together. A set of SIMD instructions 1804 can then be executed to perform a column pass of a two-dimensional 2-D IDCT concurrently on the columns of the multiple fused data blocks.

The set of machine instructions in instruction queue 1800 may include a first set of vector-to-workspace instructions 1806 to move the multiple fused data blocks into the state registers of the processor implementing a workspace. In some implementations, four vector-to-workspace instructions can be executed to store two fused data blocks into the state registers. Depending on the SIMD capabilities of the processor, additional vector-to-workspace instructions may be executed to store additional data blocks into the state registers. The set of machine instructions in instruction queue 1800 may include a set of workspace-to-vector instructions 1808 to transpose the multiple fused data blocks from the state registers. In some implementations, four workspace-to-vector instructions can be executed to transpose two fused data blocks. Depending on the SIMD capabilities of the processor, additional workspace-to-vector instructions may be executed to transpose additional data blocks. A set of SIMD instructions 1810 can then be executed to perform a row pass of a two-dimensional (2-D) inverse discrete cosine transform (IDCT) concurrently on the rows of the multiple fused data blocks, which have been arranged in column-major in the workspace to allow SIMD instructions to operate on. Next, a second set of vector-to-workspace instructions 1812 can be executed to move a result of the 2-D IDCT performed on the multiple JPEG data blocks into the state registers.

The set of machine instructions in instruction queue 1800 may also include a set of saturate-and-store instructions 1814 to store the results of 2-D IDCT performed on the multiple fused data blocks from the state registers into memory. In some implementations, sixteen saturate-and-store instructions can be executed to store two fused data blocks in memory in row-major arrangement. Depending on the SIMD capabilities of the processor, additional saturate-and-store instructions may be executed to store the results of 2-D IDCT of additional data blocks processed by the SIMD instructions. The set of machine instructions in instruction queue 1800 may include other SIMD instructions not specifically shown such as a set of SIMD instructions to dequantize the multiple fused data blocks concurrently prior to the 2-D IDCT, and/or a set of SIMD instructions to perform color conversion concurrently on the multiple fused data blocks after the 2-D IDCT.

Figure 19:
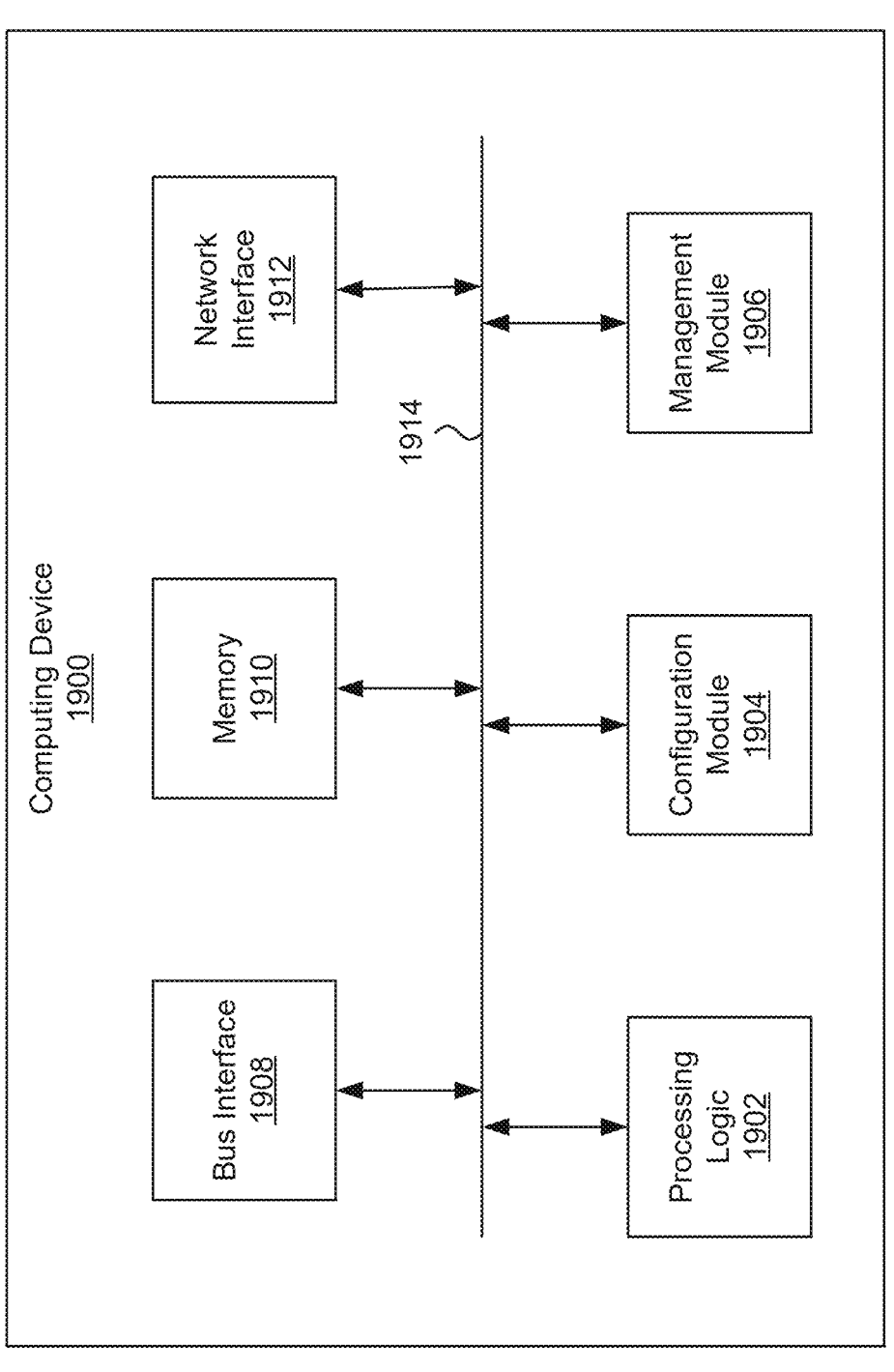
FIG. 19 illustrates an example of a computing device, according to certain aspects of the disclosure.

FIG. 19 illustrates an example of a computing device 1900. Functionality and/or several components of the computing device 1900 may be used without limitation with other embodiments disclosed elsewhere in this disclosure, without limitations. A computing device 1900 may facilitate processing of packets and/or forwarding of packets from the computing device 1900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 1900 may be the recipient and/or generator of packets. In some implementations, the computing device 1900 may modify the contents of the packet before forwarding the packet to another device. The computing device 1900 may be a peripheral device coupled to another computer device, a switch, a router or any other suitable device enabled for receiving and forwarding packets.

In one example, the computing device 1900 may include processing logic 1902, a configuration module 1904, a management module 1906, a bus interface module 1908, memory 1910, and a network interface module 1912. These modules may be hardware modules, software modules, or a combination of hardware and software. In certain instances, modules may be interchangeably used with components or engines, without deviating from the scope of the disclosure. The computing device 1900 may include additional modules, not illustrated here, such as components discussed with respect to FIG. 1. In some implementations, the computing device 1900 may include fewer modules. In some implementations, one or more of the modules may be combined into one module. One or more of the modules may be in communication with each other over a communication channel 1914. The communication channel 1914 may include one or more busses, meshes, matrices, fabrics, a combination of these communication channels, or some other suitable communication channel.

The processing logic 1902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic

1902 may be stored on a computer-readable storage medium, for example, in the form of a computer program. The computer-readable storage medium may be non-transitory. In some cases, the computer-readable medium may be part of the memory 1910.

The memory 1910 may include either volatile or non-volatile, or both volatile and non-volatile types of memory. The memory 1910 may, for example, include random access memory (RAM), read only memory (ROM), Electrically Erasable Programmable Read-Only Memory (EEPROM), flash memory, and/or some other suitable storage media. In some cases, some or all of the memory 1910 may be internal to the computing device 1900, while in other cases some or all of the memory may be external to the computing device 1900. The memory 1910 may store an operating system comprising executable instructions that, when executed by the processing logic 1902, provides the execution environment for executing instructions providing networking functionality for the computing device 1900. The memory may also store and maintain several data structures and routing tables for facilitating the functionality of the computing device 1900.

In some implementations, the configuration module 1904 may include one or more configuration registers. Configuration registers may control the operations of the computing device 1900. In some implementations, one or more bits in the configuration register can represent certain capabilities of the computing device 1900. Configuration registers may be programmed by instructions executing in the processing logic 1902, and/or by an external entity, such as a host device, an operating system executing on a host device, and/or a remote device. The configuration module 1904 may further include hardware and/or software that control the operations of the computing device 1900.

In some implementations, the management module 1906 may be configured to manage different components of the computing device 1900. In some cases, the management module 1906 may configure one or more bits in one or more configuration registers at power up, to enable or disable certain capabilities of the computing device 1900. In certain implementations, the management module 1906 may use processing resources from the processing logic 1902. In other implementations, the management module 1906 may have processing logic similar to the processing logic 1902, but segmented away or implemented on a different power plane than the processing logic 1902.

The bus interface module 1908 may enable communication with external entities, such as a host device and/or other components in a computing system, over an external communication medium. The bus interface module 1908 may include a physical interface for connecting to a cable, socket, port, or other connection to the external communication medium. The bus interface module 1908 may further include hardware and/or software to manage incoming and outgoing transactions. The bus interface module 1908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1908 may include the physical layer for any of these bus protocols, including a connector, power management, and error handling, among other things. In some implementations, the computing device 1900 may include multiple bus interface modules for communicating with multiple external entities.

These multiple bus interface modules may implement the same local bus protocol, different local bus protocols, or a combination of the same and different bus protocols.

The network interface module 1912 may include hardware and/or software for communicating with a network. This network interface module 1912 may, for example, include physical connectors or physical ports for wired connection to a network, and/or antennas for wireless communication to a network. The network interface module 1912 may further include hardware and/or software configured to implement a network protocol stack. The network interface module 1912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1900 may include multiple network interface modules, each configured to communicate with a different network. For example, in these implementations, the computing device 1900 may include a network interface module for communicating with a wired Ethernet network, a wireless 802.11 network, a cellular network, an Infiniband network, etc.

The various components and modules of the computing device 1900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 19, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system to accelerate JPEG (Joint Photographic Experts Group) image decoding, the computing system comprising:

a processor; and a decoder accelerator coupled to the processor via a decoder bus interface, wherein the processor is operable to:

parse a JPEG file to obtain a header including one or more quantization tables and a plurality of Huffman code tables;

load the plurality of Huffman code tables into the decoder accelerator via the decoder bus interface;

transmit encoded data in the JPEG file to the decoder accelerator via the decoder bus interface;

receive a set of accelerator-decoded JPEG data blocks from the decoder accelerator via the decoder bus interface;

dequantize the set of accelerator-decoded JPEG data blocks that were previously decoded by the decoder accelerator using the one or more quantization tables to generate a set of dequantized JPEG data blocks;

perform inverse discrete cosine transform on the set of dequantized JPEG data blocks that were previously decoded by the decoder accelerator to generate a set of spatial JPEG data blocks; and perform color conversion on the set of spatial JPEG data blocks to generate image data from the JPEG file, and wherein the decoder accelerator is operable to:

store the plurality of Huffman code tables provided from the processor;

receive the encoded data in the JPEG file from the processor;

generate the accelerator-decoded JPEG data blocks using the Huffman code tables; and transmit the accelerator-decoded JPEG data blocks to the processor.

2. The computing system of claim 1, wherein the processor is operable to perform the inverse discrete cosine transform on the set of dequantized JPEG data blocks in parallel with the decoder accelerator decoding another set of JPEG data blocks.

3. The computing system of claim 1, wherein the decoder bus interface is a packetized interface supporting a plurality of packet types including a starting packet type to initialize the decoder accelerator for a new JPEG file, a load table packet type to load the plurality of Huffman code tables into the decoder accelerator, and a send bitstream data packet type to transmit the encoded data in the JPEG file to the decoder accelerator, wherein each packet being transmitted from the processor to the decoder accelerator includes a packet type identifier to identify the packet type of the packet.

4. The computing system of claim 3, wherein each load table packet is transmitted with a table identifier to indicate whether the corresponding load table packet is loading an AC luminance Huffman code table, a DC luminance Huffman code table, an AC chrominance Huffman code table, or a DC chrominance Huffman code table.

5. The computing system of claim 4, wherein the table identifier indicates whether a code table corresponding to a load table packet is associated with luminance or chrominance.

6. The computing system of claim 1, wherein the processor is operable to fuse the accelerator-decoded JPEG data blocks from the decoder accelerator to match a data width of single instruction multiple data (SIMD) instructions of the processor.

7. A hardware decoder accelerator comprising:

a decoder bus interface operable to communicate with a processor; and decoder acceleration circuitry coupled to the decoder bus interface, wherein the decoder acceleration circuitry is operable to:

store a plurality of code tables provided from the processor via the decoder bus interface;

receive encoded data of a compressed data object from the processor via the decoder bus interface;

generate accelerator-decoded data blocks using the plurality of code tables; and transmit the accelerator-decoded data blocks to the processor for post-processing operations, wherein the post-processing operations of the processor include performing dequantization and inverse discrete cosine transformation on the accelerator-decoded data blocks obtained from the hardware decoder accelerator.

8. The hardware decoder accelerator of claim 7, wherein the decoder acceleration circuitry is operable to generate the accelerator-decoded data blocks while the processor is performing the post-processing operations in parallel on previous accelerator-decoded data blocks provided from the hardware decoder accelerator.

9. The hardware decoder accelerator of claim 7, wherein the decode bus interface is a packetized interface supporting a plurality of packet types.

10. The hardware decoder accelerator of claim 9, wherein the plurality of packet types includes a starting packet type to identify a start packet from the processor to initialize the hardware decoder accelerator, wherein the start packet includes information indicating a number of packets being used to transmit the compressed data object.

11. The hardware decoder accelerator of claim 9, wherein the plurality of packet types includes a load table packet type from the processor to load the plurality of code tables into the hardware decoder accelerator.

12. The hardware decoder accelerator of claim 9, wherein the plurality of packet types includes a send bitstream data packet type from the processor to transfer the encoded data to the hardware decoder accelerator.

13. The hardware decoder accelerator of claim 7, wherein the decoder acceleration circuitry is operable to:

receive a plurality of load table packets, wherein each load table packet includes a table identifier to indicate which of the plurality of code tables that the load table packet corresponds to.

14. The hardware decoder accelerator of claim 13, wherein the table identifier indicates whether a code table corresponding to a load table packet is associated with an AC component or a DC component.

15. The hardware decoder accelerator of claim 13, wherein each load table packet includes a table segment identifier to indicate which portion of code data of a corresponding code table is being provided in the load table packet.

16. The hardware decoder accelerator of claim 13, wherein the plurality of code tables includes a code table having code data that includes a lookahead table associated with the code table.

17. The hardware decoder accelerator of claim 13, wherein the plurality of code tables includes a code table having code data that includes a set of maximum values associated with the code table, wherein each of the set of maximum values corresponds to a maximum value for a different code length.

18. The hardware decoder accelerator of claim 8, wherein the post-processing operations being performed in parallel include an upsampling operation.

19. The hardware decoder accelerator of claim 8, wherein the post-processing operations being performed in parallel include a color space conversion operation.

20. The hardware decoder accelerator of claim 7, wherein the encoded data is from a JPEG image file.

* * * * *